United States Patent
Turner et al.

(10) Patent No.: US 9,575,764 B1
(45) Date of Patent: Feb. 21, 2017

(54) SYNCHRONIZING BRANCHES OF COMPUTER PROGRAM SOURCE CODE

(71) Applicant: ATLASSIAN PTY LTD, Sydney (AU)

(72) Inventors: Bryan Paul Turner, The Rocks (AU); Xu-Heng Tjhin, Eastwood (AU); Brodie Glen Rao, San Francisco, CA (US)

(73) Assignee: ATLASSIAN PTY LTD, Sydney (AU)

( * ) Notice: Subject to any disclaimer, the term of this patent is extended or adjusted under 35 U.S.C. 154(b) by 102 days.

(21) Appl. No.: 14/210,811

(22) Filed: Mar. 14, 2014

Related U.S. Application Data

(60) Provisional application No. 61/800,624, filed on Mar. 15, 2013.

(51) Int. Cl.
*G06F 9/44* (2006.01)
*G06F 9/38* (2006.01)

(52) U.S. Cl.
CPC ............... *G06F 9/3844* (2013.01); *G06F 8/71* (2013.01)

(58) Field of Classification Search
None
See application file for complete search history.

(56) References Cited

U.S. PATENT DOCUMENTS 5,675,802 A * 10/1997 Allen ................ G06F 17/30575
707/999.202
5,907,710 A   5/1999 Furukawa et al.
(Continued)

OTHER PUBLICATIONS

J. Loeliger, Version Control with Git, O'Reilly Media Inc., Sebastopol, CA US, dated Sep. 1, 2009, 330 pages.
(Continued)

*Primary Examiner* — Insun Kang
(74) *Attorney, Agent, or Firm* — Hickman Palermo Becker Bingham LLP

(57) ABSTRACT

In an embodiment, a data processing system comprises one or more processors; one or more non-transitory computer-readable storage media storing sequences of instructions which, when executed by the one or more processors, cause the processor to perform determining whether first computer program source code that is associated with an upstream repository comprises a revision that is absent from second computer program source code that is associated with a fork of the first computer program source code, wherein the first source code comprises a first branch and the second source code comprises a second branch, and wherein the first branch corresponds to the second branch; determining whether the second branch in the second source code comprises a second revision that is absent from a corresponding first branch in the first source code, in response to a determination that the first source code comprises the revision that is absent from the second source code; causing outputting to a computer display device an option to synchronize the second branch of the second source code with the corresponding first branch in the first source code in response to determining that the second branch of the second source code comprises the second revision that is absent from the corresponding first branch in the first source code; receiving a selection of the option; in response to the selection of the option, automatically synchronizing the second branch in the second source code with the first branch in the first source code.

15 Claims, 20 Drawing Sheets

(56) References Cited

U.S. PATENT DOCUMENTS

| | | | |
|---|---|---|---|
| 6,681,382 B1* | 1/2004 | Kakumani | G06F 8/71 707/999.103 |
| 7,171,616 B1* | 1/2007 | Berstis | G06F 8/65 715/205 |
| 7,552,421 B1 | 6/2009 | Raw | |
| 8,489,549 B2* | 7/2013 | Guarraci | G06F 17/30283 707/612 |
| 8,583,614 B1* | 11/2013 | Dilts | G06F 17/30575 707/695 |
| 8,627,290 B2 | 1/2014 | Clee | |
| 8,667,456 B1* | 3/2014 | Czymontek | G06F 8/315 707/696 |
| 2004/0230964 A1 | 11/2004 | Waugh | G06F 8/77 717/168 |
| 2006/0020928 A1 | 1/2006 | Hollloway et al. | |
| 2006/0224620 A1* | 10/2006 | Silverman | G11B 27/10 |
| 2006/0225040 A1 | 10/2006 | Waddington | |
| 2007/0157073 A1* | 7/2007 | Varma | G06F 17/218 715/236 |
| 2007/0168959 A1 | 7/2007 | Bayari et al. | |
| 2007/0240101 A1 | 10/2007 | Wilson et al. | |
| 2007/0283321 A1* | 12/2007 | Hegde | G06F 8/71 717/110 |
| 2008/0189681 A1 | 8/2008 | Bhogal et al. | |
| 2008/0208969 A1* | 8/2008 | Van Riel | G06F 17/30861 709/204 |
| 2009/0019426 A1* | 1/2009 | Baeumer | G06F 8/72 717/122 |
| 2009/0210857 A1* | 8/2009 | Martineau | G06F 8/35 717/120 |
| 2009/0300580 A1* | 12/2009 | Heyhoe | G06F 8/71 717/106 |
| 2009/0327358 A1* | 12/2009 | Lukiyanov | G06F 17/30038 |
| 2010/0146490 A1 | 6/2010 | Grosse et al. | |
| 2010/0257457 A1* | 10/2010 | De Goes | H04L 65/1093 715/751 |
| 2011/0072062 A1* | 3/2011 | Guarraci | G06F 17/30283 707/831 |
| 2012/0180024 A1* | 7/2012 | Gonzalez | G06F 8/71 717/109 |
| 2012/0246618 A1* | 9/2012 | Schatz | G06F 8/71 717/122 |
| 2013/0036400 A1* | 2/2013 | Bak | G06F 8/71 717/101 |
| 2013/0076773 A1 | 3/2013 | Chen | |
| 2013/0097687 A1* | 4/2013 | Storm | H04L 63/0807 726/9 |
| 2013/0111443 A1* | 5/2013 | Kedla | G06F 8/71 717/122 |
| 2013/0151940 A1* | 6/2013 | Bailor | G06F 17/24 715/229 |
| 2013/0159365 A1* | 6/2013 | Boctor | G06F 8/71 707/827 |
| 2013/0185252 A1* | 7/2013 | Palmucci | G06F 17/30011 707/608 |
| 2013/0263289 A1 | 10/2013 | Vijayan | |
| 2013/0275957 A1 | 10/2013 | Villar | |
| 2014/0033068 A1 | 1/2014 | Gupta et al. | |
| 2014/0181789 A1* | 6/2014 | Canter | G06F 8/34 717/113 |
| 2014/0196010 A1 | 7/2014 | Balachandran | |
| 2014/0222758 A1 | 8/2014 | March | |
| 2015/0199414 A1* | 7/2015 | Braginsky | G06F 17/30578 707/613 |

OTHER PUBLICATIONS

B. O'Sullivan, Making Sense of Revision-Control Systems, 52 Communications of the ACM 9 at 57-64, ACM, New York USA, dated Jan. 1, 2009, 7 pages.

U.S. Appl. No. 14/210,969, filed Mar. 14, 2014, First Office Action Interview, Jul. 23, 2015.

U.S. Appl. No. 14/211,118, filed Mar. 14, 2014, First Office Action, Oct. 26, 2015.

U.S. Appl. No. 14/210,969, filed Mar. 14, 2014, Interview Summary, Oct. 20, 2015.

\* cited by examiner

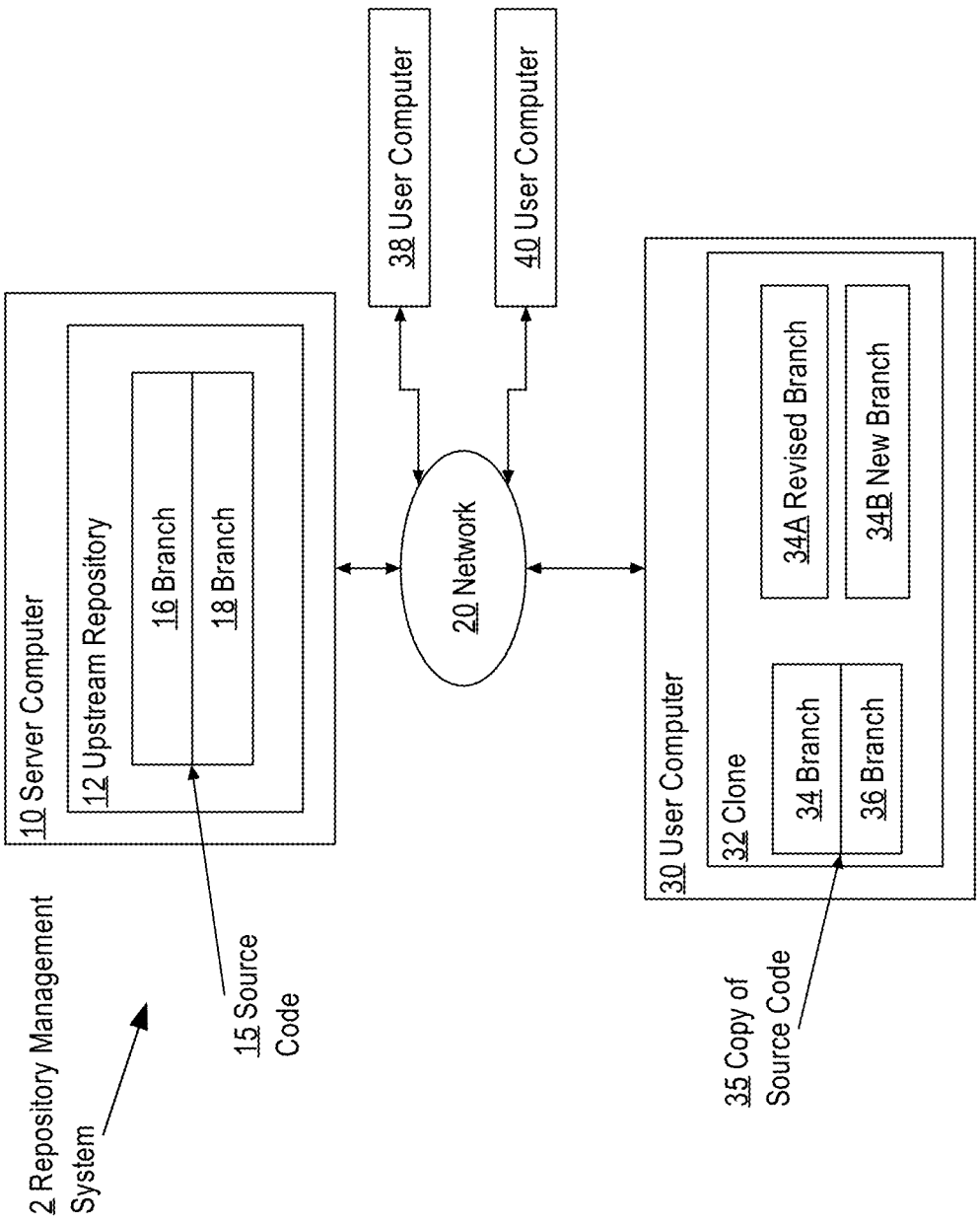

(On-premises)

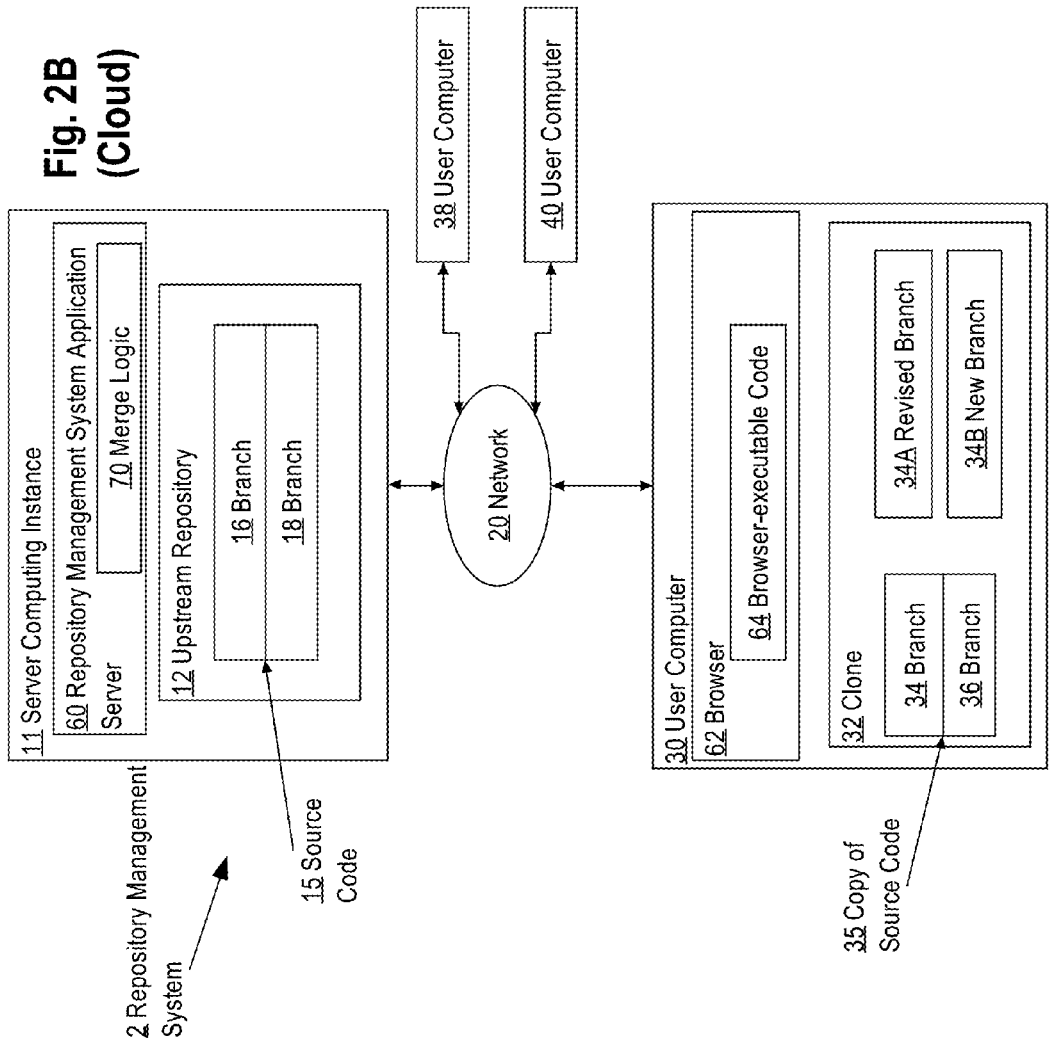

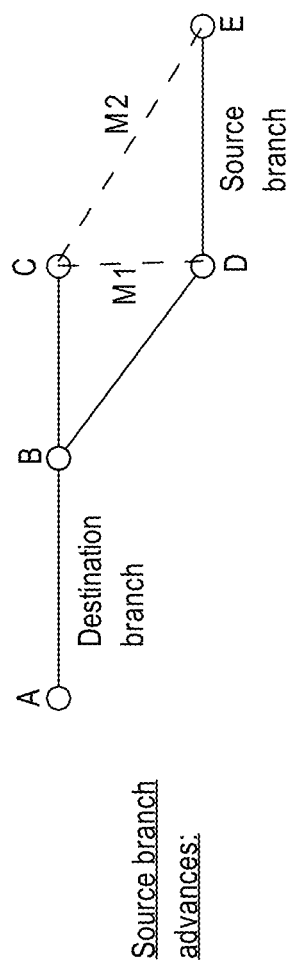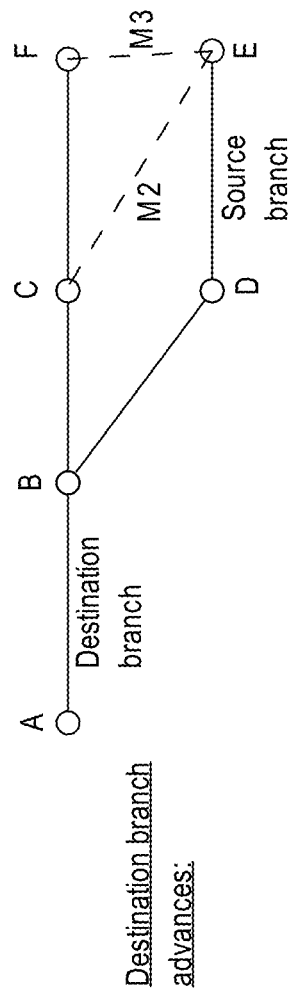

SYNCHRONIZING BRANCHES OF COMPUTER PROGRAM SOURCE CODE

BENEFIT CLAIM

This application claims the benefit of provisional application 61/800,624, filed Mar. 15, 2013, the entire contents of which is hereby incorporated by reference for all purposes as if fully set forth herein, under 35 U.S.C. §119(e).

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright © 2013-2014 Atlassian Pty Ltd.

FIELD OF THE DISCLOSURE

The present disclosure generally relates to distributed version control systems as used in computer program development. The disclosure relates more specifically to techniques in a distributed version control system for synchronizing a copy of at least a portion of source code with the original source code and/or another portion; techniques for determining and correcting for drift in the position of comments in code; and techniques for previewing the result of a merge of different versions of source code before actually performing the merge.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In computer software development, version control systems are used to track and manage computer program source code as the code is written and revised. Version control systems include centralized version control systems and distributed version control systems. Centralized version control systems typically manage a single copy of a project in a centralized location such as a server computer, and programmers commit changes to the central copy.

Distributed version control systems include MERCURIAL, GIT, and BAZAAR, and do not necessarily use a centralized server computer to store all versions of the code. Each programmer may create a copy of the program source code, termed a clone, which is locally stored in a repository of that programmer or a group; the repository maintains metadata representing a complete history of a project involving the original code, the programmer's changes, and often changes of other programmers. Software development environments with distributed version control systems typically enable programmers to create, revise and store computer program source code in the form of text files. The development system typically saves a revision to source code by overwriting an existing version of a source code file with a new version of the file. If a programmer revises the source code, stores the new version in the file, compiles the new version of the file, and learns that the execution of the compiled new version results in an error, the programmer may be able to identify the specific revision that introduced the error if the programmer can restore the old version of the file. A development system with a version control feature can facilitate the identification of errors by enabling a programmer to access previous and current versions of the source code. These environments support operation with many users who are widely distributed across distant geographic locations yet working on the same source code project, by communication over internetworks.

This approach enables each user to have a full history of the source code. The second copy of the repository may be termed a fork, and the original repository on the server computer may be termed a canonical, main repository, or upstream repository. The system also may enable a user to duplicate or clone the fork, store the clone on the user's computer, work on the clone, and then merge the clone back to the upstream repository, or merge the clone back to a clone of the fork that is on the server computer. With this approach, many users can work on clones of the fork and exchange revisions. Unfortunately, some systems can manage and control such clones and forks only using relatively simple features of a file system of the operating system on which the systems operate. For example, the GIT distributed version control system may use UNIX operating system filesystem permissions to control read and write access to GIT repositories of source code. This approach is unsophisticated and cannot manage conflicts arising from attempts of multiple different users to merge their different clones into the same repository on the server computer.

SUMMARY

The appended claims may serve as a summary of the invention.

BRIEF DESCRIPTION OF THE DRAWINGS

In the drawings:

FIG. 1 illustrates a computer system having an upstream repository with branches and a fork with other branches;

FIG. 2B illustrates a computer system for implementation in a shared remote data center;

FIG. 5A illustrates comment drift when a source branch advances;

FIG. 5B illustrates comment drift when a destination branch advances;

FIG. 17 illustrates an example user interface display for use in merge preview with diff displayed, in a cloud-based embodiment;

FIG. 18 illustrates an example user interface display for use in previewing a merge in which conflicts in a diff exist, in a cloud-based embodiment;

DETAILED DESCRIPTION

Figure 2A:
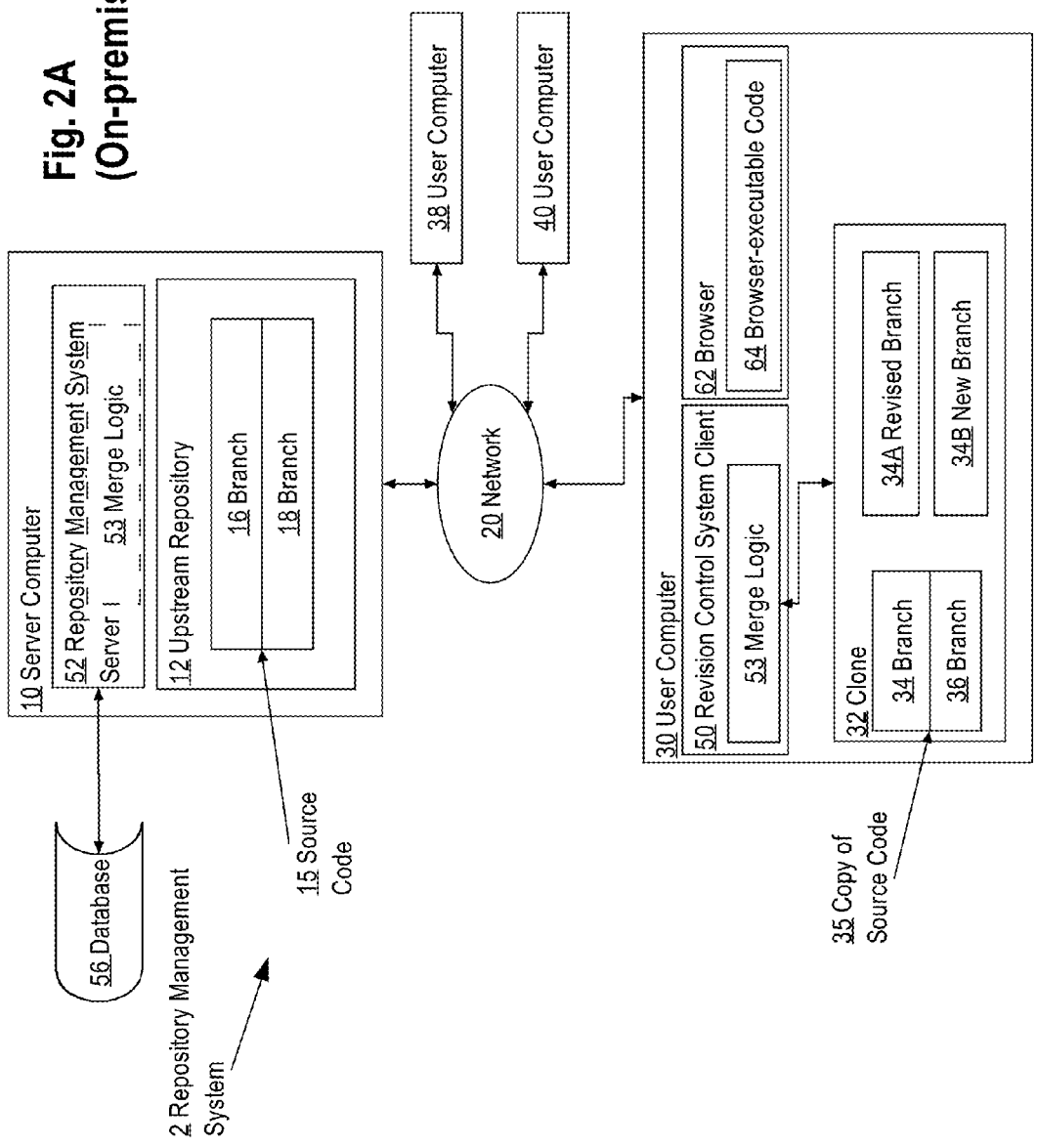
FIG. 2A illustrates a computer system for an on-premises implementation.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

This description follows the following outline:
1. Structural Overview
2. Synching and Merging Repositories
   2.1 Operational Context and Problem Domains
   2.2 On-Premises Implementation
   2.3 Remote Shared Data Center Implementation
3. Determining and Correcting Comment Drift
   3.1 Operational Context and Problem Domains
   3.2 On-Premises Implementation
   3.3 Remote Shared Data Center Implementation
   3.4 Fully Worked Example
4. Merge Preview
   4.1 Operational Context and Problem Domains
   4.2 On-Premises Implementation
   4.3 Remote Shared Data Center Implementation
5. Implementation Example—Hardware Overview
1. Structural Overview In an embodiment, a repository management system provides enhanced mechanisms to interact with and manage access to repositories of source code of a distributed version control system. One embodiment may be implemented using an on-premises system such as STASH, which is commercially available from Atlassian Pty Ltd., Sydney, Australia, and provides a GIT repository management system for enterprise users in which repositories are stored on computers that are isolated from the public internet by firewalls and/or other appropriate security systems. GIT is a distributed version control and source code management system with an emphasis on speed that was initially developed for LINUX kernel development. Each GIT working directory is a code repository that has complete history and revision tracking metadata and functions, and is not dependent on network access or a central server. An embodiment may be implemented using computers and systems configured in a remote shared data center or cloud computing infrastructure, for example, using BITBUCKET, which also is commercially available from Atlassian. BITBUCKET supports storing source code in cloud-based computing instances, in either public or private repositories. Both STASH and BITBUCKET support user authentication, repository security, and integration with existing databases and development environments, for use with up to large numbers of users, including thousands of users per repository.

Merging in version control comprises combining two or more sets of changes to version-controlled files to result in a merged version with all the changes. In some cases, such as when two or more sets of changes do not conflict, merging may be automatically performed. For example, automatic merging typically involves two non-conflicting sets of changes of two different users to a set of files. If the changes conflict, then manual merging is typically used in prior approaches to reconcile conflicts. For example, manual merging can be used to combine two overlapping, conflicting versions of configuration files by selecting the most desirable configuration commands from each version and placing them in a third, merged version. As another example, manual merging has been needed when two different changes are made to the same line of source code, such as one user changing a function name and a second user adding a comment. In such a case, the version control system typically prompts the user for a decision to pick one of the changes to apply to the merge result. Research in merge processing has resulted in developing three-way merge, recursive three-way merge, fuzzy patch application, weave merge, and patch commutation.

Branching comprises duplication of a source code file, directory tree, or other item that is subject to version control, so that changes can be made to the original and the duplicate, each of which is termed a branch. Branches may be termed streams, or code lines. The original branch may be termed the parent branch, upstream branch or backing stream. Duplicate branches may be termed child branches. A branch without a parent branch may be termed a trunk or mainline.

Changes to a child branch may be merged into the parent branch, or merged into the trunk, even if the trunk is not a direct parent of the child branch. A repository that is derived from and related at least in part to an upstream repository may be termed a fork; typically a fork is subject to different licensing terms, serves a different purpose, or implements a different feature or function, as compared to its parent.

FIG. 1 illustrates a computer system having an upstream repository with branches and a clone with other branches according to one embodiment. A repository management system 2 may comprise a server computer 10 coupled directly or indirectly through one or more networks 20 to user computer 30. The server computer 10 hosts an upstream repository 12 that stores source code 15 for a project or application. As an example, the source code 15 may comprise one or more branches 16, 18. In this context, a branch may refer to a named set of computer program code, typically a set related to a particular feature or function, such as a set of classes or methods.

Network 20 may comprise a local area network (LAN) of an enterprise in one embodiment; in this case, system 2 may be implemented as an on-premises solution in which the server computer 10 and user computer 30 are associated with the same business enterprise and at least the server computer is within an enterprise-controlled facility that is protected from open internetworks using firewalls or other security systems. In another embodiment, network 20 may represent a public internetwork and the server computer 10 may be located off-premises with respect to an organization involved in software development, such as in a shared data center or cloud computing facility.

User computer 30 and optionally a plurality of other user computers 38, 40 each may host a clone 32 comprising a copy 35 of source code. The copy 35 generally duplicates the source code 15 of the upstream repository 12. The clone 32 may comprise one or more branches 34, 36 for use by a particular user of the user computer 30. The clone 32 also may include a revised branch 34A and a new branch 34B that duplicate in part the code in branch 34; the use of revised branches and new branches is described further herein in other sections. In an embodiment, branches 34, 36 of clone 32 correspond respectively to branches 16, 18 of upstream repository 12. In this context, a first branch is a "corresponding branch" of a second branch when the second branch began as a copy of the first branch and then was subjected to one or more revisions, so that the first and second branch continue to correspond in content at least in part.

In a GIT repository management system such as STASH or BITBUCKET, a pull request defines a request to merge changes from a source branch to a destination branch, either within the same repository or across clones or forks. The term "pull request" derives from the notion of requesting a manager of the upstream branch for permission to pull a downstream programmer's changes up into the upstream branch, and typically involves review and approval by a user other than the programmer who made the changes. Accepting a pull request comprises or results in merging the source branch into the destination branch. The system may provide a user interface configured to display the differences between the branches and to obtain input about how to merge the changes.

The pull request may include source code that comes from one repository, including a fork or branch, into another. A pull request across branches of the same repository may be specified. Pull requests also can be used indirectly to update or synchronize two different repositories. For example, the user may incorporate a pull request into clone 32 or can incorporate a code change by pulling the code manually into a local repository such as clone 32 and pushing the resulting repository back to the upstream repository 12, which may be associated with STASH, BITBUCKET, or a similar system.

If the changed code contained within a pull request conflicts with the code contained in the user's repository, then the code in the pull request must be manually pulled to the user's repository and the request may be resolved there. Conflicts may be resolved locally by merging as described herein, for example, and then the changes are pushed back to the upstream repository 12. After the push, the upstream repository 12 may show the request as accepted. Copying the changes contained in the branches that are about to be merged as part of the pull requests into a repository on the developer's computer is a means for evaluating a code change in depth before accepting the change.

FIG. 2A illustrates a computer system for an on-premises implementation of the system of FIG. 1. In the example of FIG. 2A, server computer 10 hosts a repository management system server 52, which comprises one or more application programs, libraries, APIs or other software elements that implement the features and functions that are further described herein. Server 52 may include merge logic 53, which is configured to implement merge conflict resolution, merge previewing, and correction of comment drift in relation to pull requests in the manner described further herein.

User computer 30 may host a revision control system client 50 having merge logic 53, and the client may include complete implementations of functional logic for merge conflict resolution or merge previewing. The specific division of labor between server 52 and client 50 is not critical and may vary in different embodiments based upon performance tradeoffs and other factors.

In the implementation of FIG. 2A, typically the upstream repository 12 is at server computer 10, and each of the user computers 30, 38, 40 hosts a local repository such as clone 32. Each repository on user computers 30, 38, 40 initially may be a complete clone of the upstream repository 12 after which changes in branches 34, 36 may be merged into corresponding branches 16, 18 of upstream repository 12.

Server computer 56 may be coupled to a database 56 that is configured to store metadata relating to branches 16, 18 and other aspects of repository 12, such as data relating to each commit that is performed in the upstream repository, and other project management data, and the like.

In FIG. 2A, typically server computer 10 and user computers 30, 38, 40 are coupled to a LAN and/or WAN in the form of network 20 and are logically located behind a firewall or other security appliance; typically the computers are associated with one business enterprise or institution.

FIG. 2B illustrates a computer system for implementation in a shared remote data center. In the arrangement of FIG. 2B, the repository management system 2 is implemented using one or more server computing instances 11 that are instantiated on or hosted in a shared data center or cloud computing infrastructure. Examples include AMAZON WEB SERVICES, RACKSPACE, and private cloud data centers. There may be any number of server computing instances 11 instantiated from time to time based upon the number of user computers 30, 38, 40 that access the instances, or other performance requirements.

An executable image of each server computing instance 11 includes a repository management server 60 which comprises one or more application programs, libraries, APIs or other software elements that implement the features and functions that are further described herein. The upstream repository 12 may be implemented using MERCURIAL, as an example. Server 60 may include merge logic 70, which is configured to implement merge conflict resolution, merge previewing, and correction of comment drift in relation to merges in the manner described further herein.

In the arrangement of FIG. 2B, network 20 may represent at least one internetwork, such as the public internet, in combination with one or more wired or wireless LANs, WANs, or other network or access infrastructure such as cable modems, routers, etc.

While FIG. 2B shows the upstream repository 12 associated with the server computing instance 11, the upstream repository 12 also may reside on any of the other user computers 38, 40. Any of the peer computers that communicate with server computing instance 11 in the cloud may host a code repository, including an authoritative upstream repository 12 and not just a clone 32.

In the arrangements of either FIG. 2A, FIG. 2B, user computer 30 may a browser 62 that is configured to request, render and display electronic documents that conform to a markup language such as HTML, XML or extensions, and is capable of internally executing browser-executable code 64 such as JAVASCRIPT, ACTIVE SERVER PAGES, or other forms of code, as specifically seen in FIG. 2B. Thus, in this arrangement, aspects of functional logic of the system 2 may be distributed to the user computers 30, 38, 40 as browser-executable code 64, where appropriate. However, the use of browser-executable code 64 is not required and other embodiments may deliver pure HTML to the browser 62 for rendering. Each user computer 30, 38, 40 may manage a local repository such as clone 32 based upon a MERCURIAL repository.

2. Synching and Merging Repositories 2.1 Operational Context and Problem Domains In various embodiments, the techniques herein address several problems that the inventors have identified in the conventional operation of distributed version control systems. As one example, when a user works on a branch of that user's clone of a fork, the code in the fork may become outdated relative to revisions to the source code from which the fork was copied. The user may be focusing on creating multiple revisions to the branch in the clone, rather than on synchronizing the revisions in the source code into the fork. Or, the user may not be ready to merge the revisions in the clone back into the fork. The user may return to a work on a branch in a clone that includes outdated code, to continue revisions that the user previously started. For example, a user might make a clone of a fork for a banking application and revise a branch in the clone. The user might then work on a different application, during which time other users make other revisions to the same branch of the banking application from which the fork was copied. The other users may agree to merge the other revisions into the code from which the fork was copied. When the first user returns to make and submit other revisions to the same branch in the user's clone of the fork, that clone of the fork lacks the other users' revisions. The first user no longer can submit any revisions made to the branch in the user's clone of the fork, for merging back into the original fork, because such a merge operation would result in conflict errors.

In such a situation, the user typically is required to exit the repository management system and use a filesystem command-line mechanism to download these revisions to the source code from which the fork was copied to the user's computer, and then manually push the revisions to the source code from which the fork was copied back up into the user's fork, in a very tedious multi-step process that is prone to errors. Consequently, keeping a fork up to date with revisions to source code from which a fork was copied can be a major burden in projects involving multiple users with different responsibilities and/or multiple users in widely geographically distributed locations. For less frequently updated forks, the divergence may become so large that it may be easier for a user to delete their fork and start all over again, rather than try to synchronize their fork with the revisions to the source code from which the fork was copied. Clearly, there is a need for techniques that improve the performance, efficiency and ease of use of synchronizing a copy of source code with that source code in another location.

In one embodiment, this disclosure provides systems and methods for synchronizing one copy of computer program source code with the source code. In this context, "copy of source code" typically refers to a branch of a fork of a particular user in a group of users, and "the source code" refers to an earlier or different version of the same code, fork or branch, which may have been revised by other users at different times. In an embodiment, the system determines whether the source code includes any revision that is absent from the copy of the source code. Continuing with the example above, a repository management system may detect revisions to the source code of a banking application that are missing from a user's fork of the banking application's source code. In one feature, the system determines whether a branch in the copy of the source code includes any revision that is absent from a corresponding branch in the source code if the source code includes any revision that is absent from the copy; detecting this condition may be termed detecting that the branch in the copy of the source code is ahead of the same branch in the upstream version of the source code. For example, the system determines that a branch in the user's fork of the banking application's source code includes revisions that are absent from the corresponding branch in a banking application's source code.

In an embodiment, the system can synchronize the copy of the source code with the source code if the branch in the copy of source code does not include any revision that is present in the corresponding branch in the source code. For example, the repository management system automatically synchronizes revisions to the banking application's source code to the user's fork of the banking application's source code because no conflicts exist between the branches of the banking application's source code and the user's fork of the banking application's source code.

In an embodiment, in response to detecting missing changes, the system causes displaying a message in a user interface stating an option to synchronize the branch in the copy of the source with the corresponding branch in the source code. For example, the system causes displaying multiple options to synchronize the conflicts for branches in the user's fork of the banking application's source code with the branches in the banking application's source code. The user interface may receive a selection of an option to synchronize the branch in the copy of the source code with the corresponding branch in the source code. For example, the system receives a request or user input indicating to merge the conflicting branch in the user's fork of the banking application's source code with the corresponding branch in the banking application's source code. In some embodiments, rather than generating a message in the user interface requesting resolution of the missing changes, the system 2 may be configured to automatically generate a pull request notifying one or more users about the conflict and requesting resolution.

In response, the system synchronizes the branch in the copy of the source code with the corresponding branch in the source code based on the selection of the option. For example, the repository management system merges the conflicting branch in the user's fork of the banking application's source code with the corresponding branch in the banking application's source code. The synchronization options may identify one or more reasons why the branch in the copy of the source code differs from the corresponding branch in the source code. This solution improves the performance, efficiency and ease of synchronizing a copy of source code with the source code. The solution also offers the particular technical effect of changing the operational process of a computer by arranging the computer to perform an automatic merge conflict determination, generating warning and prompt messages in a user interface, and automatically synchronizing the code as specified in user input—all operations not available in prior computer implementations.

2.2 On-Premises Implementation

Figure 3:
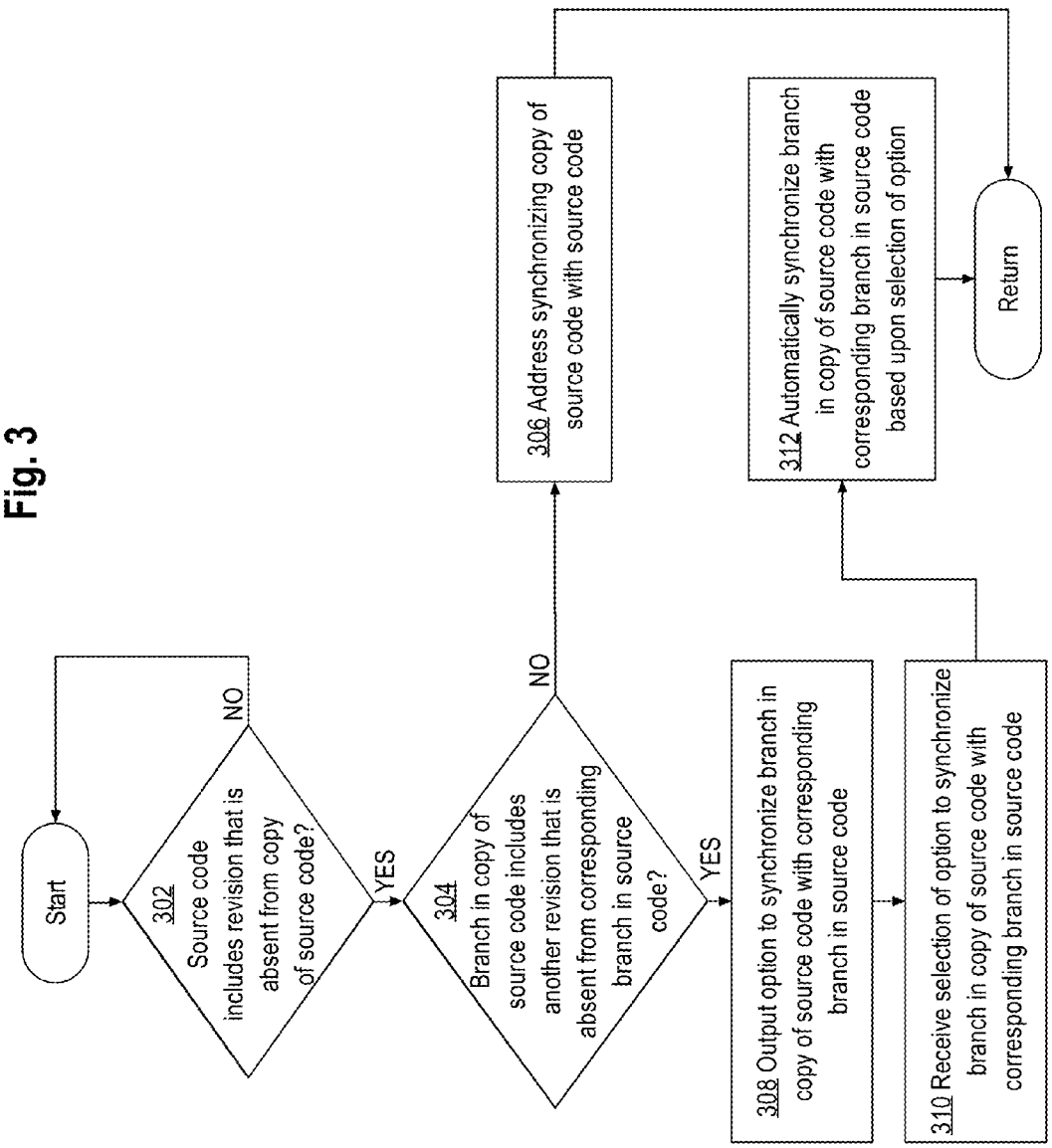
FIG. 3 illustrates a process of synchronizing a copy of source code with the source code.

FIG. 3 illustrates a process of synchronizing a copy of source code with the source code. FIG. 3 may be implemented in the context of a repository that has been marked with an option to automatically synchronize to the main line whenever a divergence of a branch occurs and is detected.

At block 302, the process determines whether source code includes any revision that is absent from a copy of the source code. As one example that is not intended to limit the scope of FIG. 3, the repository management system 2 detects revisions to the source code 15 for a banking application—from which a clone 32 was made—that are absent from the user's clone 32 of the banking application's source code. The repository management system 2 also may detect revisions to the user's clone 32 of the banking application's source code that are absent from the banking application's original source code 15, and in one embodiment may output a prompt via a user interface for the user to submit a pull request to merge the revisions to the user's clone 32 of the banking application's source code 15 into the banking application's original source code 15. In this context, a pull request may consist of records and messages that effectively request a peer, manager or other reviewer to examine the code changes of the first user and approve merging those changes into the upstream repository.

If the source code 15 includes any revision that is absent from the copy of the source code such as branches 34, 36, then control moves to block 304 to check for any branch conflicts. If the source code 15 includes no revision that is absent from the copy 35 of the source code, then control returns to block 302 to continue checking for revisions to the source code 15.

In block 304, the process determines whether a branch in the copy of the source code includes any other revision that is absent from a corresponding branch in the source code in response to a determination that the source code includes any revision that is absent from the copy of the source code. For example, the repository management system 2 determines that the branch 34 in the user's clone 32 includes revisions that are absent from the corresponding branch 16 in the banking application's source code 15. If the branch 34 only exists in the user's clone 32, then synchronizing revisions to the source code 15 from which the clone 32 was copied, with the fork, will not affect such a branch 34, unless the branch 34 is based upon another branch (not shown) that was deleted from the source code 15 from which the clone 32 was copied. If the branch 34 in the copy 35 does not include any revision that is absent from the corresponding branch 16 in the source code, then control transfers to block 306, to address whether or how to synchronize the source code 15 with the copy 35. In one embodiment, block 306 may comprise prompting the user to perform manual synchronization. In another embodiment block 306 could be configured to automatically synchronize the source code 15 with the copy 35 of the source code without any user intervention. If the branch 34 in the copy 35 includes any revision that is absent from the corresponding branch in the source code, the process continues to block 308 to offer options for the conflicting branches.

In an embodiment, a user who creates the clone 32 can selectively enable the ability to synchronize the clone 32 created from the upstream repository 12 of the source code 15. In other words, enabling fork synchronization may be selected when the clone 32 is created. The user may toggle between enabling and disabling fork synchronization, which may be based on system performance or other factors.

In an embodiment, the repository management system 2 also may have the option to output prompts to synchronize a clone 32 via a user interface even when the user interface is not responding to a request to display a branch 34 in the fork or to display the fork. For example, the repository management system 2 could be configured to detect all prospective merge conflicts, and to prompt the user whether to perform synchronization, each time that the source code 15 of the upstream repository 12 is updated by another user, and/or each time that the system starts up, and/or or each time that the user performs a local backup of the clone 32. The user may select to disable such a synchronization prompt message option, to avoid receiving a synchronization prompt every time an update occurs to the source code 15 from which the clone 32 was copied, for example, if the updates occur so often that the user receives too many synchronization prompts. In an embodiment, a user also may instruct the system to conditionally enable synchronization prompting, for example, to receive synchronization prompts via e-mail once per day, or periodically receiving synchronization prompts only for revisions to a branch 16 in the source code 15 from which the clone 32 was copied that correspond to a branch 34 that the user has revised in the user's clone 32. In an embodiment, the user may disable sending the synchronization prompt in response to differences that are due solely to revisions that the user made to the branch 34 in the user's clone 32, as the user already knows about the difference between the branch 34 in the user's clone 32 and the corresponding branch 16 in the original source code 15, because the user just created the difference when the user made the revision to the branch 34 in the user's clone 32.

At block 306, the copy 35 of the source code can be synchronized with the source code 15 if the branch 34 in the copy 35 of the source code does not contain any revision that is absent from the corresponding branch 16 in the source code 15. For example, the repository management system 2 automatically synchronizes revisions to the banking application's source code 15 to the user's clone 32 of the banking application's source code 15, because no conflicts exist between the branches 16, 18 of the banking application's source code 15 and the user's clone 32 of the banking application's source code 15.

At block 308, a user interface outputs an option to synchronize the branch 34 in the copy 35 of the source code with the corresponding branch 16 in the source code 15 if the branch 34 in the copy 35 of the source code includes any revision that is absent from the corresponding branch 16 in the source code 15. For example, the repository management system 2 outputs an option to synchronize each conflicting branch 34, 36 in the user's clone 32 of the banking application's source code with the revisions to the corresponding branches 16, 18 in the banking application's source code 15. In an embodiment, a user with write access can see a visual indication that a branch 34 in the user's clone 32 has diverged from the corresponding branch 16 in the source code 15, meaning that the user's fork is no longer the same as the source code from which the fork was copied. Visual indications may include displaying source code text in different colors, using highlights, graphical boxes, or other techniques.

In an embodiment, the system 2 may be configured to enable an option to provide users with read-only access to also see the visual indication that the branch in the user's clone 32 has diverged from the corresponding branch 16 in the source code 15 from which the clone 32 was copied. The synchronization option may identify any reason why the branch 34 in the copy 35 of the source code differs from the corresponding branch 16 in the source code 15. Reasons for differences and corresponding synchronization options are described further herein in connection with block 312, and TABLE 1 presents an example notification message.

In block 310, the user interface receives a selection of the option to synchronize the branch 34 in the copy of source code 35 with the corresponding branch 16 in the source code 15. For example, the repository management system 2 receives a selection of an option to merge the revisions to the branch 34 in the user's clone 32 of the banking application's source code 35 with the revisions to the branch 16 in the banking application's source code 15.

At block 312, the branch 34 in the copy 35 of the source code is synchronized automatically with the corresponding branch 16 in the source code 15 based on the selection of the option. For example, the repository management system 2 merges the revisions to the branch 34 in the user's clone 32 of the banking application's source code 35 to with the revisions to the same branch 16 in the banking application's source code 15. If the system 2 determines that revisions have been made to both the branch 34 in the clone 32 and to the corresponding branch 16 in the source code 15, such that the branch 34 has diverged from the source code 15 from which the clone 32 was copied, the user may select a synchronization option to create a revised branch 34A in the clone 32 that retains any revisions from the branch 34 in the clone 32 and any revisions from the corresponding branch 16 in the source code 15. In an embodiment, the system 2 creates a merged version (branch 34A) of the branch 34 in the user's clone 32 of the banking application's source code 35 that includes the revisions to the branch 16 of the banking application's source code 15 and the revisions to the branch 34 in the user's clone 32 of the banking application's source code 35. When the system 2 responds to a user's merge request, the user interface may provide an indicator that a merge is in progress, report whether the merge succeeded or failed, identify any conflict errors, and offer instructions about how the user can resolve any conflict errors.

In one embodiment, when the user has not made any revisions to the branch 34 in the clone 32 that the user wants to retain, the user may select a synchronization option to replace the branch 34 in the fork 32, along with the user's revisions, with the corresponding branch 16 in the source code 15. The repository management system 2 also may output the option to save the revisions to the branch 34 in the fork 32 before overwriting the branch 34 in the fork 32 with the branch 16 in the source code 15. In an embodiment, the repository management system 2 saves the revisions to the branch 34 in the user's fork 32 of the banking application's source code 35 to a new branch 34B in the user's fork 32 of the banking application's source code 35 that still corresponds to a branch 16 in the banking application's source code 15.

If the repository management system 2 determines that the user had made revisions to the branch 34 in the clone 32 and that no revisions have been made to the corresponding branch 16 in the source code 15, so that the branch 34 is ahead (in terms of revision history or progress) of the source code 15 from which the clone 32 was copied, the system 2 may output a synchronization option for the user to submit a pull request to update the user's revisions to the branch 34 in the clone 32 to the branch 16 in the source code 15. If the user has already submitted a pull request to update revisions to a branch 34 in the user's clone 32 that includes revisions that are absent from the corresponding branch 16 in the source code 15, the repository management system 2 may either disable the synchronization prompt or add information to the synchronization prompt that notifies the user that the user has already submitted the pull request.

In an embodiment, if the system 2 determines that the corresponding branch 16 in the source code 15 has been deleted, such that the branch 34 in the clone 32 is eclipsed, then the user may select a synchronization option to delete the branch 34 in the clone 32, possibly after saving the revisions to the branch 34 in the clone 32 to a new branch 34B in the fork. For example, the repository management system 2 saves the revisions to the branch 34 in the user's clone 32 of the banking application's source code 35 to a new branch 34B in the user's clone 32 of the banking application's source code 35 that still corresponds to a branch 16 in the banking application's source code 15, and deletes the old branch 34 in the user's clone 32.

If the system 2 determines that the user has not made any revisions to the branch 34 in the clone 32, and that revisions have been made to the corresponding branch 16 in the source code 15, then the user may select a synchronization option to replace the branch 34 in the copy with the corresponding branch 16 in the source code 15. For example, the repository management system 2 replaces the branch 34 in the user's clone 32 of the banking application's source code 35 with the same branch 16 in the banking application's source code 15. If the user has yet to make any revisions to the branch 34, then no revisions are overwritten when the branch 34 is updated based upon the corresponding branch 16.

The operations described above may be repeated as desired, and may be performed asynchronously, meaning that no specific order of operations is intended in the preceding description unless an explicit order is stated or unless one operation is stated as responsive to another operation.

The prompt messages in the user interface may vary in form and content in various embodiments. In one embodiment, one of the prompts that has been previously described is generated in the form of a window, sub window, pane or panel in a graphical user interface. Example content is set forth in TABLE 1.

Table 1—Example User Interface Window

Synchronize master
Master Branch could not be synchronized automatically because it has diverged from upstream. Each branch includes changes the other does not.
To synchronize, select one of these strategies:
MERGE. Merge the upstream branch into the fork branch.
DISCARD. Overwrite the branch with upstream, discarding your changes.

In this example, MERGE and DISCARD, with or without the associated text, may be implemented as buttons, icons, or other GUI widgets that are selectable using appropriate user input to cause performing the operation described in the associated text. In one embodiment, the MERGE option, when selected, causes creating a merged version of the branch 34 in the user's clone 32 of the banking application's source code 35 that includes the revisions to the branch 16 in the banking application's source code 15 and the revisions to the branch 34 in the user's clone 32 of the source code 35. In an embodiment, the DISCARD option, when selected, causes deleting the branch 34 in the user's clone 32 of the banking application's source code 35, and may enable the user to first save the revisions to the branch 34 in the user's clone 32 to a new branch 34B in the user's fork, which may still correspond to a branch 16 in the banking application's source code 15, before deleting the old branch 34 in the user's clone 32.

The prompt window also may indicate a default option or selection as the MERGE option, which the user may change to the DISCARD option by highlighting the DISCARD option. In an embodiment, if the user selects the DISCARD option, the system 2 may cause displaying a warning message to request user input to confirm the operation. An example message is ARE YOU SURE? YOUR REVISIONS WILL BE LOST, but other text or content may be used in other embodiments.

The prompt window may display a synchronization prompt in other ways. For example, the window may include a tooltip that informs the user that a displayed branch 34 in the user's clone 32 includes revisions that are absent from the corresponding branch 16 in the source code, and/or messaging next to a SYNCHRONIZE button, in which the messaging provides the synchronization prompt.

The prompt window may form a part of a larger display screen that includes fields for users to enter commands to create, retrieve, edit and store records. The system 2 may output a display screen that includes the prompt window as shown in TABLE 1 in response to a search based upon search criteria that is input via a user interface. The specific sizes and positioning of the content of the example window of TABLE 1 are not critical.

2.3 Remote Shared Data Center Implementation

In one embodiment, merge conflict resolution also may be implemented in the context of the remote shared data center context of FIG. 2B. In this embodiment, only the main branch is synchronized across forks, rather than all branches of the fork, and synchronization is not performed automatically. In an embodiment, conflicts in synchronizing the main branch across forks are automatically detected, and the user is then automatically prompted to determine whether synchronization should occur. The same automatic detection and confirmation technique may be used for differences among branches in the same repository. For example, in one embodiment, if a user is in a branch view, merge logic 70 is configured to detect automatically that the branch is out of synchronization with respect to the main line, and the user is provided with an option to synchronize to the main line. In response to selecting the option, the branch is automatically synchronized to the main line.

This approach offers added flexibility to ensure that synchronization is expected and desired by the user, and may use fewer resources than an always-automatic synchronization approach. For example, it may be complex in some implementations to match branches across multiple forks; synchronization may require analysis of branch names or other heuristics that lack a high confidence level for accuracy.

3. Determining and Correcting Drift of Comments

3.1 Operational Context and Problem Domains

Pull requests can be used to review team members' code before merging, building and deploying. Repository management system 2 may be configured to accept entry of comment text in association with a particular line of source code in a pull request, for example when code reviews are performed. The comment text, while not forming a part of the source code, may be bound to a particular line of source code, based upon a line number of that code, so that the system 2 causes displaying the comment to all users who view the associated line of code. This approach facilitates communication among users in a team so that each team member can correlate a particular comment to a particular line of code.

In such a system, handling the movement or drift of comments typically is a serious issue. Comment drift may occur when successive code changes or commits amend a pull request after an initial comment is left on a line; such action may change the line number of the line in the source code that is associated with a comment, so that after the commit the comment becomes associated with the wrong line of code. Users desire to have the comment appear in the right place within the source code even if line numbers change.

Figure 4:
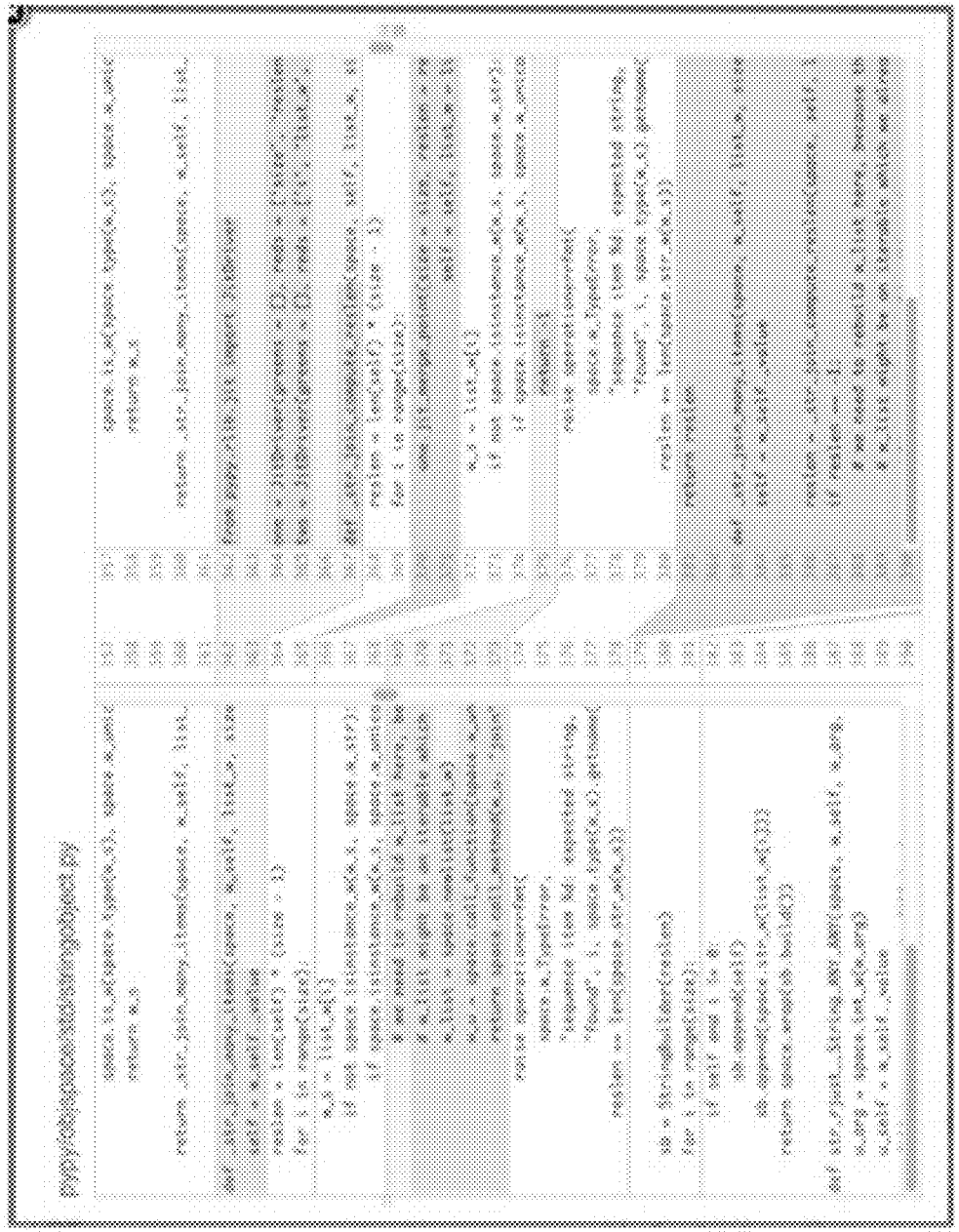
FIG. 4 illustrates an example graphical user interface displaying a side-by-side comparison of two versions of a computer program.

FIG. 4 illustrates an example graphical user interface displaying a side-by-side comparison of two versions of a computer program. In computing, a file comparison utility program generically termed a diff is configured to output the differences between two files. A diff typically is used to show the changes between one version of a file and a former version of the same file; diff usually displays the changes that are made, per line, for text files. Changes to a file may change or remove a line that has a comment, so that the line associated with the comment no longer exists in the diff, or exists in a different form. Such comments are termed eclipsed comments, because the changes cover the line to which the comments are anchored and that line has changed or has been removed. In some systems, eclipsed comments are still shown, for example, in an activity tab, with the diff as it was before the comment was eclipsed.

Consequently, keeping comments on lines of source code associated with the correct lines, in the face of continuous changes, can be difficult. Some approaches to calculating comment drift rely upon looking for matching strings within the source code, but this method often results in attributing comments to incorrect lines of code.

In an embodiment, a data processing method provides complete accuracy in associating code comments with the position in the source code that they were made. In an embodiment, the process determines where an inline comment might have been moved and thus determines comment drift. In an embodiment, each comment is stored in a database record that associates the comment with a specific source code change set. When new change sets occur as a result of revisions to the code, the location of the comments is recalculated. Therefore, the comment drift is applied to the change set of a previous code version with which the comment was associated, based upon the diff between the earlier version of the code and the present version of the code. The original numbering of the code is retained, and comments are presented relative to that numbering outside of the code in another location of the screen. All comments are stored in a database in records that associate the comments with a specific change set, such as database 56. When new change sets occur as a result of revisions to the source code, the location of comments is automatically re-determined, and comment drift values are applied to the change set of a prior code version at the lines to which the comment was attached, based upon determining a diff between the prior code version and a present version of the code.

In an embodiment, database 56 is configured to store a hash of a comment in association with a hash value identifying a commit of a source code change, a "to" line number and a "from" line number. Based upon these values, drift can be calculated based upon the diff of the prior code version compared to a present version of the code, and the line number associated with a comment may be updated in the database 56. In an embodiment, if a comment is associated with a line of code that has been deleted, moved or otherwise is not relevant to a display of a particular other line of code, then the comment is not shown for that line.

FIG. 5A illustrates comment drift when a source branch advances. In comment drift when a source branch advances, more changes are committed to the source branch of a pull request, and the pull request is edited to include these changes. FIG. 5A illustrates an example in which an original version of a pull request is to merge commit D into a main branch comprising commits A, B, C. The merge originally shown was M1. Assume that commit E has been added to the pull request, and merge M2 is what should be shown.

If the comments are on files that are not modified in the diff between merges (M1, M2), the process updates the comment records or objects in the database to confirm that they are relevant to new version anchors E and C in the example of FIG. 5A. This situation may be termed a fast-forward case.

If the comments are on files that commit E does affect, then more complex processing is performed. The fast-forward process may be applied to comments on ADDED, REMOVED, or CONTEXT lines.

In an embodiment, a meta-diff, or the diff between merges M1 and M2, is analyzed for comments on added lines; these lines may be identified in the pull request view using a green color, for example. In an embodiment, for each portion of the meta-diff occurring before the line that was commented on, the process adjusts or drifts the comment's position by a net total of the number of lines that were added or removed in that portion or hunk of the code. If the portion overlaps the commented line, then the comment is eclipsed. If the portion is after the commented line, then the portion has no effect on the comment.

FIG. 5B illustrates comment drift when a destination branch advances. In the example of FIG. 5B, assume that a new commit F was pushed to the destination branch. Any comments that commit F did not affect can be fast-forwarded. The meta-diff between merges M2, M3 is used to determine drift on comments on added lines. In an embodiment, the diff between commits C, F is used to determine the drift for comments on removed lines and context lines.

In an embodiment, when the target side changes, the diff for the new commit (C, F) may be used to drift comments on CONTEXT and REMOVED lines, and the meta-diff (M2, M3) drifts comments on ADDED lines. However, if the default branch of the upstream repository 12 is merged back into the feature branch 34 of the user clone 32 and the pull request is updated to resolve conflicts, then the source branch advances, but the diff from commit E does not properly express the drift. This problem is effectively addressed in an embodiment as further described in subsequent sections.

Figure 6A:
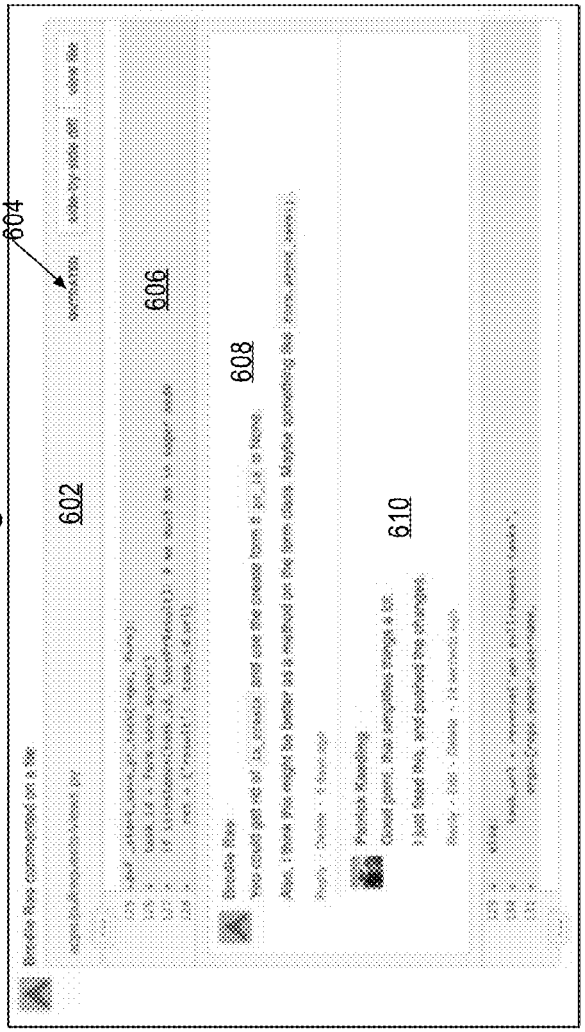
FIG. 6A illustrates inline comments in an activity tab and showing outdated comments based upon detection of comment drift.

FIG. 6A illustrates inline comments in an activity tab and showing outdated comments based upon detection of comment drift. In one embodiment, system 2 is configured to display a graphical user interface panel 602 that includes lines of source code 606 and comments 608, 610 superimposed on the code in association with a particular line of code. In the example of FIG. 6A, a first user (Brodie) made a comment 608 in the past, which prompted a second user (Patrick) to made a change in the code 606 and enter a later comment 610. The change in the code 606 renders comment 608 obsolete. In an embodiment, panel 602 includes an OUTDATED identifier 604 to alert the user that the at least one of the currently displayed comments 608, 610 is no longer relevant to the displayed lines of code. In an embodiment, user selection of the OUTDATED identifier 604 causes the system to redisplay the outdated comment 608 using highlighting, distinctive color, or other distinctive display.

Figure 6B:
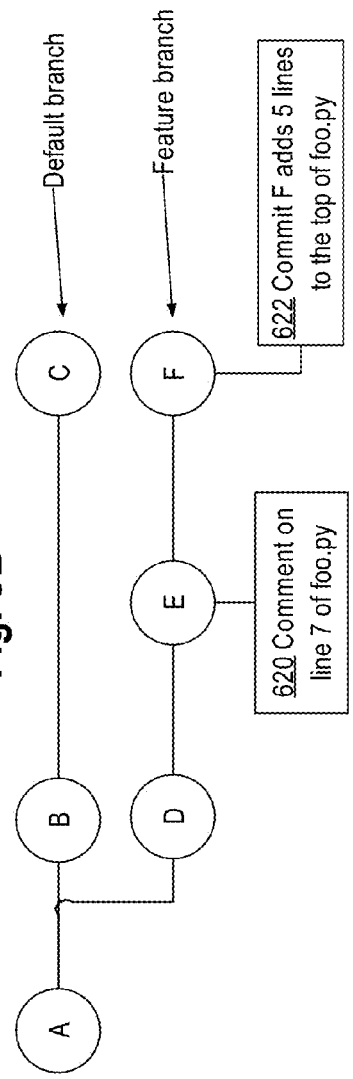
FIG. 6B illustrates application of a comment drift process in an embodiment.

FIG. 6B illustrates application of a comment drift process in an embodiment. In FIG. 6B, symbols A, B, C, D, E, F represent discrete commits of changes to source code; commits A, B, C occur on a default branch of the code whereas commits D, E, F occur only on a feature branch of the code, for example, a branch in a fork where a particular user is addressing a particular feature of an application represented in the code. FIG. 6B illustrates an example in which a comment 620 references code that was on line 7 of a hypothetical PYTHON file denoted FOO.PY, and the comment was made when commit E was the most recent commit in a pull request. However, after a later commit F, the same code relating to the comment is now line 12 because 5 lines have been added to the top of the FOO.PY file. Similarly, lines could be removed before the line that was commented on, or the line that was commented on could be removed or changed. In an embodiment, comment 620 is moved so that it is displayed on line 12 and not line 7 in a diff view, to counter the drift effect that is apparent in FIG. 6B, as showing the comment at line 7 would no longer be accurate.

Figure 7:
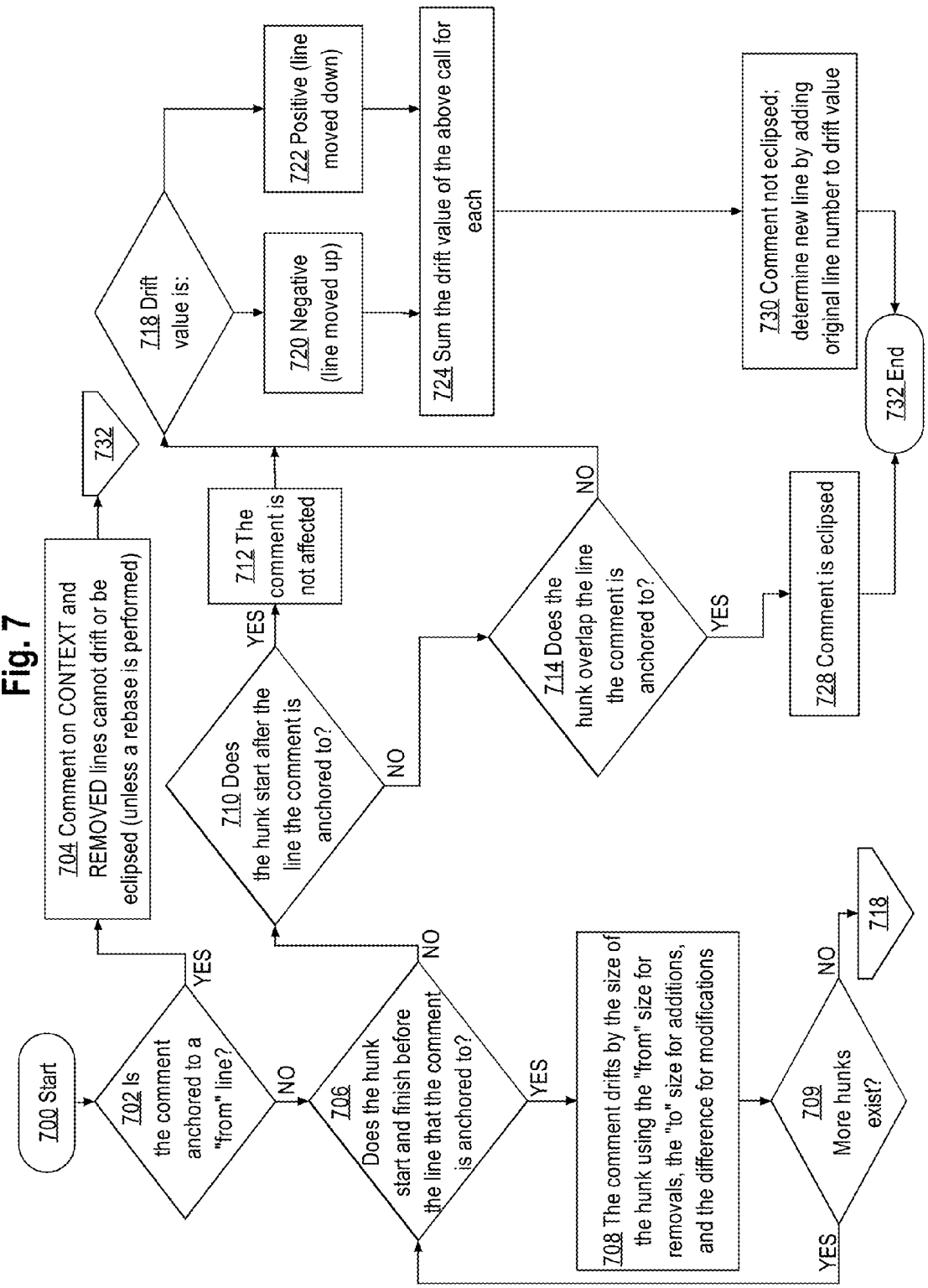
FIG. 7 illustrates a process of determining comment drift.

FIG. 7 illustrates a process of determining comment drift. In an embodiment, the merge logic of system 2 is configured to determine a diff between a version of source code to which a comment is anchored and the latest version in the pull request. Each code portion or hunk of the diff that relates to the file that was commented upon is then subjected to the process of FIG. 7, and successive hunks are processed with FIG. 7 successively until all comments are resolved. In other words, using the process of FIG. 7 assumes that the system has prepared and has available the state of code associated with a pull request before and after the pull request was changed by the addition, removal or changing of lines that have comments. For purposes of illustrating a clear example, FIG. 7 generally illustrates processing for ADDED lines, but similar techniques may be used to adjust for drift in the case of REMOVED or CONTEXT lines.

At block 700, the process initiates. At block 702, the process tests whether the comment is anchored to a "from" line; if so, in the case of CONTEXT or REMOVED lines then the comment cannot drift or be eclipsed, as seen at block 704, unless a history of the code was essentially rewritten, for example, using a rebase operation. The effect of rebasing is further discussed at the end of this section. Therefore, after block 704 control passes to block 732 at which the process ends. If the test of block 702 is false, then control passes to block 706.

If the hunk starts and finishes before the line to which the comment is anchored, as tested at block 706, then the comment drifts by the size of the hunk, using the "from" size for removals, the "to" size for additions, and the difference for modifications as seen at block 708. To indicate repetition of the process, block 709 tests whether more hunks exist; if so, control returns to block 706 to consider the next hunk, and if not, control passes to the test of block 718. If the test of block 706 is false, control passes to block 710.

As tested at block 710, if the hunk starts after the line to which the comment is anchored, then the hunk has no effect on the comment as seen at block 712.

If the hunk overlaps the line to which the comment is anchored, as tested at block 714, then the hunk eclipses the comment as seen at block 728. In this case, the amount of drift is irrelevant. At block 714 if the hunk does not overlap the line the comment is anchored to, then control passes to block 718.

At block 718, the drift values that were determined at block 708 are applied to the starting line number and ending line number that are associated with the comments, effectively adjusting the position associated with the comment to the correct line number range. At block 720, negative drift values indicate that the line moved up, and positive drift values indicate that the line moved down, as seen at block 722.

At block 724, the results of the process at this point are summed for each hunk, resulting in determining a final drift value for the current comment. At block 730, then the new line number is determined by adding the drift value to the original line number. The process concludes at block 732.

Referring again to block 704, if a user rewrites the version history of the source code by performing a rebase operation after a pull request has been created, then the process may be unable to locate the code that is associated with a particular comment. In GIT, rebasing is a way to integrate changes from one branch into another that differs from a merge operation; rebasing also can be used on a single branch. In a merge operation, two latest snapshots of a branch and the most recent common ancestor of the snapshots are combined in a new snapshot and commit. In contrast, in a rebase operation, a patch of a change is reapplied; for example, with rebasing, all changes that have been committed on one branch can be applied to another branch. Internally, rebasing may comprise identifying a common ancestor of a current branch and a second branch onto which the patch is to be rebased, determining a diff between the current branch and each commit, saving the diffs to temporary files, resetting the current branch to the same commit as the branch onto which the system is rebasing, and applying each change successively.

In response, the process may mark the comment as eclipsed, since user has removed the code to which the comment was originally attached. An eclipsed comment may be displayed without associated code or other context.

Embodiments have been described that provide a process to determine where comments have moved within changed computer program source code. Embodiments support performing rapid merges in response to pull requests. Because pull request diffs are formed between the merge commit and the tip of the target branch, an up-to-date diff is provided to the process; this approach also enables the system to rapidly display a banner in response to a pull request that a merge conflict has been identified requiring user intervention to select an approach for automatically resolving the merge conflict. Embodiments also provide accurate merge results and predictable merge results.

3.2 On-Premises Implementation

Figure 8:
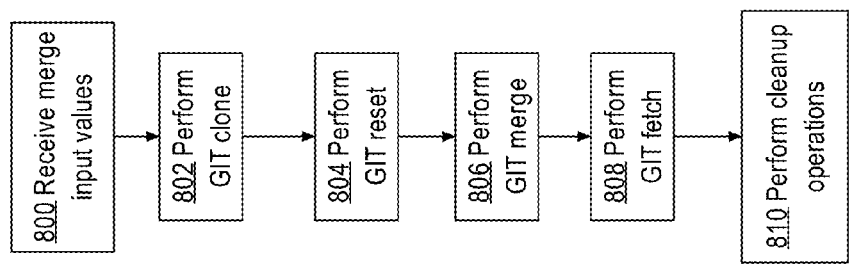
FIG. 8 illustrates one embodiment of a process of merging branches of source code.

FIG. 7 illustrates a process of determining comment drift, and FIG. 8 illustrates one embodiment of a process of merging branches of source code. While the process of FIG. 7 may be used in both an on-premises implementation and a cloud-based implementation, in an embodiment the branch merge processes are implemented differently in these different contexts.

In one embodiment, a process of determining comment drift is implemented in the context of other processes that perform merging of source code branches. Therefore, as foundation, this description first addresses an example process for merging. Referring first to FIG. 8, in one embodiment a merge process is implemented using the merge logic 210 (FIG. 2A). At block 800, the process receives a plurality of merge input values as part of a user request to perform a merge. In an embodiment, the following input values are received: identity of a source repository to merge from; identity of a destination repository to merge into; identity, such as a name and hash value, of a branch to merge into, termed the "to" branch; identity of a branch to merge from, termed the "from" branch; identity of a user who is requesting or performing the merge, termed the "author," for use in recording a name and e-mail address of the author for tracking purposes; a commit message. Additionally, as part of processing the merge request, in this embodiment, a temporary directory is created on user computer 30 for storing a GIT clone, and is used only for a single merge.

At block 802, the process performs a GIT clone operation. Performing the GIT clone operation involves cloning the to-branch into the temporary directory for working purposes. In one embodiment, the following GIT command may be used:

git clone --no-checkout --shared -b (to branch) (repository path) (temporary directory)

where (to branch) identifies the destination branch, (repository path) identifies a pathname of the repository of the to-branch, and (temporary directory) identifies the temporary directory on the user computer 30. For this command, the system working directory is used as the working directory for this command. The --no checkout option prevents the clone from populating the working copy with all files from the tip of the branch to the end. After the clone completes, then, the working copy is empty aside from the *.git directory. Because some repositories have a large codebase, performing a full checkout in this manner can take up to several seconds depending on machine resources. The --shared option sets up a GIT alternatives file in the .git/objects/info directory. This file points to the objects directory of the origin repository, allowing the clone to use both loose and packed objects from the origin directly. The -b option sets HEAD to the desired branch for performing the merge.

At block 804, the process performs a GIT reset operation. In an embodiment, the inventors have found that using the GIT clone operation with the --no-checkout option causes every file in the repository to be staged for deletion, which is undesirable as it could cause an unexpected subsequent deletion of important files. In an embodiment, block 804 resets the staged-for-deletion markings so that all such files are unstaged for deletion. The following command may be used: git reset --quiet (to hash) --

The temporary directory for the clone is used as the working directory for this command. In an embodiment, the (to hash) value enables the process to address race conditions that may arise. For example, assume that User A selects MERGE on a pull request from Source to Target. At this time, the Target hash is 1234567 and the Source hash is abcdefg. The diff shown was comparing to revision 1234567, so those are the changes that have been reviewed and are being accepted. Assume further that User B pushes certain changes to the Target. The push could occur as a result of merging in response to another pull request, to the same branch at nearly the same time, or a GIT push. In this situation, if the (to hash) value is not included in the GIT reset command, then the from-branch would be merged into the to-branch at the current tip revision of the target, resulting in a merge that does not match what the pull request showed. Instead, by resetting to a specific commit, the process herein ensures that the overall merge fails in the example given above, because the resulting merge commit is not fast-forwarded from the current tip of the to-branch.

At block 806, the process performs a GIT merge operation. With the temporary clone ready, the merge may be performed using the following command: git merge --log --no-ff --quiet -m (commit message) (from hash)

The temporary directory for the clone is used as the working directory for this command. In this command, the --log option includes the summaries from the most recent commits, such as up to the last 20 commits, which are included based upon the (from hash) value and not already on the to-branch. The --no-ff option ensures that a merge commit is created even when the from-branch is a descendant of the to-branch. This approach is useful because the system stores the merge commit for the pull request, and also because the commit message indicates the pull request that is being merged.

The (from hash) value is used rather than a from-branch value to ensure that what is merged for the pull request corresponds to exactly the revisions that were reviewed and accepted by the user. In an embodiment, the following environment variables also are set: GIT_AUTHOR_E-MAIL; GIT_AUTHOR_NAME; GIT_COMMITTER_EMAIL; GIT_COMMITTER_NAME. In an embodiment, these environment variables are used to record the name and e-mail address of the user who selected MERGE in the user interface, to establish a record of the author and committing party for the resulting merge commit.

At block 808, the process performs a GIT fetch operation. At this point, the merge has been performed in the temporary clone, and needs to be transferred back to the real repository. The following GIT fetch command may be used: git fetch (temporary directory) HEAD: (to branch)

The real repository's directory is used as the working directory for this command. The HEAD keyword is used in reference to the remote branch to fetch because HEAD is the merge commit in the temporary clone. The symbolic name HEAD is de-referenced on the remote repository. The (to branch) value is given in the "refspec" to instruct GIT to update that branch in the local repository. In an embodiment, if new changes have been pushed to the to-branch since the merge was requested, this fetch fails to update the ref. This approach causes the GIT system to return an error message to the user indicating that the pull request is out of date.

At block 810, the process performs one or more cleanup operations. In an embodiment, after the merge commit has been fetched back into the real repository, the entire temporary clone is deleted. The clone operation uses relatively few resources, in comparison to maintaining a clone or time and addressing locking of the clone to prevent performing concurrent merges on it; therefore, re-creating the clone on-demand is more efficient. The hash for the merge commit is returned by the GIT system and may be stored in a system database for later reference; the hash value may appear in an activity stream for the pull request to enable users to navigate to the change set page for the merge.

The foregoing description addresses merging pull requests in response to a user selection of a MERGE button or other GUI widget provided in the user interface of the system 2. In an embodiment, displaying a diff for a pull request also involves performing a merge operation of the kind described above. In an embodiment, a diff by the system 2 can show any conflicts between incoming changes and a target branch. Displaying the conflicts may involve parsing output of a GIT merge, determining conflicts that were encountered based upon the output, applying GIT commands to resolve the conflicts and executing a "git merge" command to produce a merge commit.

3.3 Remote Shared Data Center Implementation

In one embodiment, the foregoing process may be implemented in the remote shared data center context of FIG. 2B in a manner that is similar to the foregoing description, but the creation of a clone repository is not required. Instead, a temporary index and temporary tree may be used as described in section 4.3 in relation to merge preview operations.

3.4 Fully Worked Example

Figure 19:
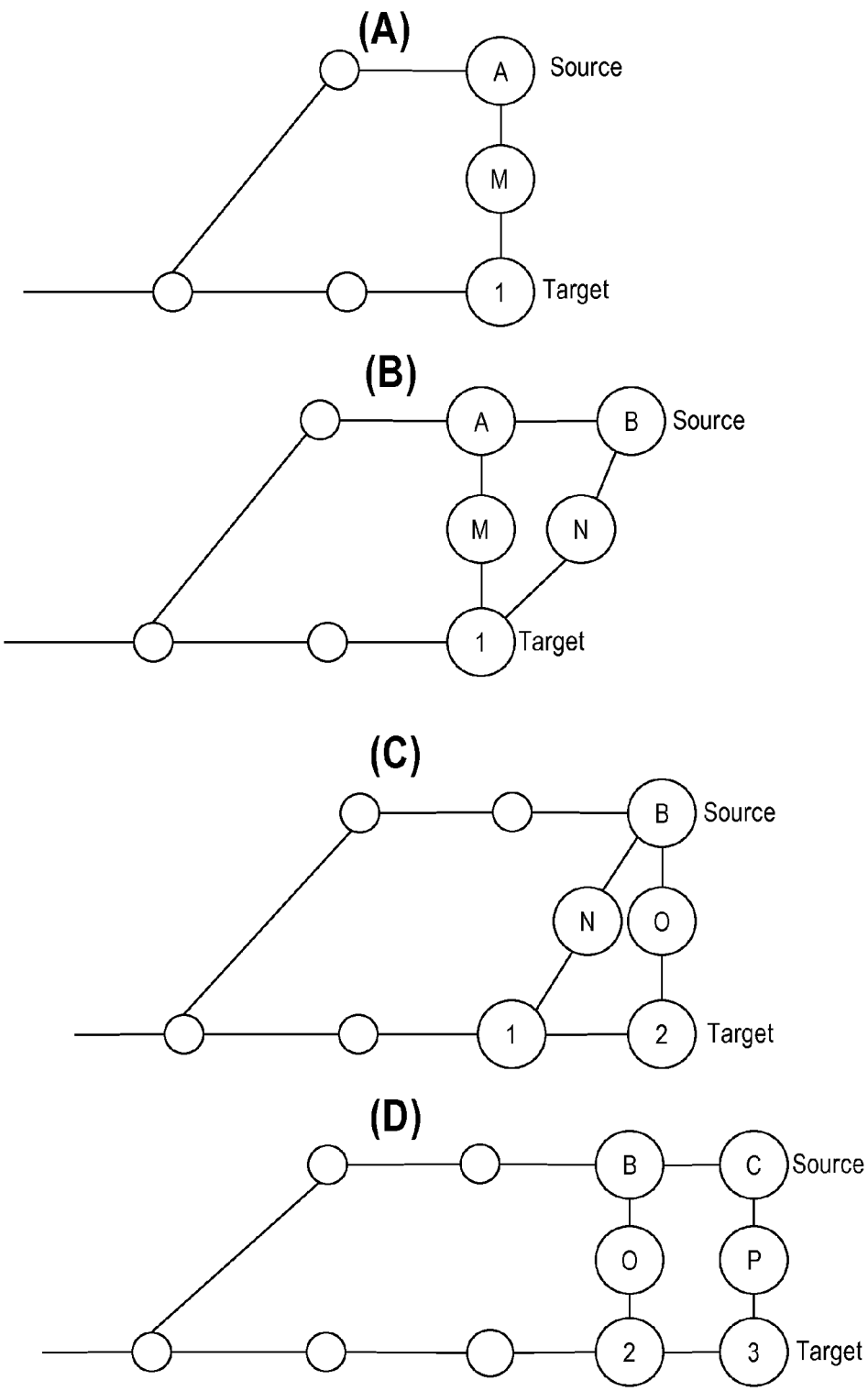
FIG. 19 is a four-part illustration of branches that may assist in illustrating an example embodiment of comment drift processing.

FIG. 19 is a four-part illustration of branches that may assist in illustrating an example embodiment of comment drift processing. In general, embodiments implement a programmatic strategy that calculates comment drift by parsing diffs between the previous state of the pull request and its current state.

In an embodiment, each comment anchor has a line type associated with it which indicates which "side" of the pull request the line came from. ADDED lines come from the from (or "source") side of the pull request, and all other lines are from the to (or "target") side. The drift calculated by this strategy can result one of several possible outcomes for any given anchor. A first outcome Drifting, for anchors whose line numbers have been changed due to lines being added or removed before them. A second outcome is Orphaning, for anchors on lines which have been changed since the comment was added. A third outcome is Retaining, for anchors in files which are not changed in any diff, or on lines which are before any new lines are added or removed.

FIG. 19(A) illustrates an example pull request. Node A represents the tip revision on the source branch, and 1 is the tip revision on the target branch. M identifies the theoretical merge commit which is used by the pull request's effective diff. Assume that a rescope happened which updated the pull request's source branch, as seen in FIG. 19(B). B is now the tip revision of the source branch, and N is the new theoretical merge commit used by the effective diff, while 1 is still the tip revision of the target branch. This rescope introduces the following diffs:

A to B: At first, it would appear that added lines could be drifted by this "source diff", because the added lines were introduced by the A commit. However, because comments are added to, and anchored in, the theoretical merge, the line numbers where the added lines appear might not match their line numbers in commit A. As a result this diff is meaningless for drift.

M to N: This could be considered the "meta diff"; it describes how the diff has changed with the rescope. Added lines will have their drift calculated by performing this diff, because it takes into consideration how the code on the target branch may have impacted the line numbers when the comments were added. Lastly, note that context and removed lines can never drift in this rescope; because they are anchored relative to the code in commit 1, which is still the current tip for target, their line numbers are always unchanged.

FIG. 19(C) illustrates an example in which a rescope has updated the target branch. In this example, 2 is now the tip revision of the target branch, and O is the new theoretical merge commit used by the effective diff; B is still the tip revision of the source branch. The previous A and M commits are no longer relevant, and so they have been omitted. Note that a rescope to either side always introduces a new theoretical merge. This rescope introduces the following diffs:

N to O: As with FIG. 19(B), this "meta diff" will be used to calculate drift for added lines.

1 to 2: context and removed lines, which are anchored to lines from commit 1, will have their drift calculated by performing this "target diff".

Unlike a rescope on the source branch, a rescope on the target branch can trigger drift for comments on all line types.

FIG. 19(D) illustrates a rescope which updates both the source and target branches. In FIG. 19(D), C is now the tip of the source branch, 3 is now the tip of the target branch and P is the new theoretical merge commit used by the effective diff. For the purposes of calculating drift, this scenario is identical to FIG. 19(C). Consider the diffs:

B to C: As described for FIG. 19(B), this "source diff" is meaningless for drift because no anchors are actually attached to it.

O to P: As with FIG. 19(B) and FIG. 19(C), this "meta diff" will be used to calculate drift for added lines.

2 to 3: As with FIG. 19(C), this "target diff" will be used to calculate drift for both context and removed lines.

In sum, the "meta diff" (the diff between the theoretical merge commits) is used to calculate drift for added lines and the "target diff" is used to calculate drift for both context and removed lines.

After calculating drift, if any comments are still considered "reachable", meaning they have either been retained unmodified or have drifted to a new line, the final step is to run the pull request's current effective diff. By matching the calculated anchors against the effective diff, two possible scenarios are covered. First, a matching, compatible change was made on the other side of the pull request, effectively converting any affected lines from whatever their previous type was to context. Second, the drift calculations are wrong, because the code is incorrect. Either of the scenarios above triggers the comment to be orphaned. The current drift processing performed by this strategy will never update an anchor's line type. Note that comments on context lines can be orphaned by this check; if the diff changes in a way that shifts context lines such that the context around a change no longer includes them. For example, if a change is reverted all of the context lines around that change may disappear from the new effective diff if there are no other changes nearby to include them.

FIG. 19 also may assist in illustrating an example embodiment of the fast-forward strategy. In general, embodiments attempt to expedite or "fast-forward" treatment of comments that are in files that were not changed between the previous effective diff and the current effective diff, or between the previous target revision and the current target revision. One benefit of this strategy is that it does not run full diffs for anything; all it needs to do is check for changed paths. The strategy assumes, to an extent, that a command like diff-tree in GIT requires less computation (and will therefore be faster) than performing a GIT diff. If a path which has comments in it has not been updated on either side of the pull request, it follows that the anchors will always match unchanged in the new effective diff.

To correctly calculate whether a comment can be fast-forwarded, changes between two pairs of revisions are considered. Referring again to FIG. 19(B), calculating the anchors that are capable of fast-forwarding in this case only needs to consider the changes between M and N, because only the source side of the pull request has been updated. Comments on any path which has not been changed between M and N can immediately be retained.

Checking for changed paths between A and B would not take renames that come from the target branch into consideration, and so it is not a useful check. If a file was renamed in commit 1 on the target branch, it will show up with the new name in merges M and N. Comments, since they are added in and anchored to the effective diff, will have the new name as well. The file will still have its old name in commits A and B.

As a result, if the file was changed between A and B, the path that would show up in the change tree would not match the commented path, and the anchors would be incorrectly fast-forwarded.

Referring again to FIG. 19(C), calculating anchors capable of fast-forwarding anchors in this case only needs to consider the changes between 1 and 2, because only the target side of the pull request has been updated. If files have been renamed on the source side, their source paths ("src-Paths") will match against paths that exist in the target-side diff, meaning changes to the srcPath for a rename will still correctly prevent comments from being fast-forwarded without needing to check updated paths between N and O.

Referring again to FIG. 19(D), for the purposes of calculating fast-forward drift, this scenario is the combination of the scenarios of FIG. 19(B) and FIG. 19(C). Anchors for paths which have changed between O and P or between 2 and 3 cannot be fast-forwarded. It is necessary to check both sets of changes because it is possible changes have been made on the target branch between commit 2 and commit 3 which duplicate some or all of the changes made on the source branch. If the changes on both sides are identical, there are no changes between O and P, but comments on added or removed lines may have been orphaned because those lines have now become context lines.

Because this strategy performs very little processing, it is the highest priority strategy. It is capable of immediately retaining all comments after running only a single change tree, if a pull request has only been rescoped on one side (the most common case), or two if it has been rescoped on both.

4. Merge Preview 4.1 Operational Context and Problem Domains

Modern software development may involve writing and revising lengthy, complex programs; as a result of this complexity, programmers may have difficulty visualizing the consequences of a proposed merge and may perform erroneous merges. In an embodiment, a computer-implemented process provides a preview of the results of a merge of two sets of changes to two branches of source code for a program into a single resulting branch that has both sets of changes. In an embodiment, a user interface display includes a merge element which, when selected, invokes a computer-implemented preview service that performs a merge preview in a preview partition of a repository. Displaying the merge preview indicates the prospective result of merging the specified branches.

Embodiments may be configured to address several different operational scenarios. For example, in one example, a user might make "hot fixes" by changing a branch of production source code manually, without using a pull request; the user would then need to merge those changes into a staging branch or development branch of code for use by others. As another example, a user with a fork may wish to merge in changes from an upstream repository, thus performing a merge operation that typically is the reverse of that involved in a pull request.

4.2 On-Premises Implementation

In an embodiment, to ensure that the user compares source code changes to the destination repository before requesting a merge operation, controls for requesting the merge operation are integrated into a code comparison function. In one embodiment, a user uses system 2 to navigate to a repository having the changes and selects a COMPARE widget. In response, the system 2 causes displaying a code comparison panel. Typically the user adjusts the values of source and destination repositories and/or branches to match a pull request that the user anticipates making, and selects an INCOMING function widget to cause displaying how the destination repository has changed since the user has been working. If no changes in the destination repository occurred, the system 2 reports that no changes occurred. If changes occurred, then the system provides the user with suggestions for merging the changes into the user's repository.

Figure 9:
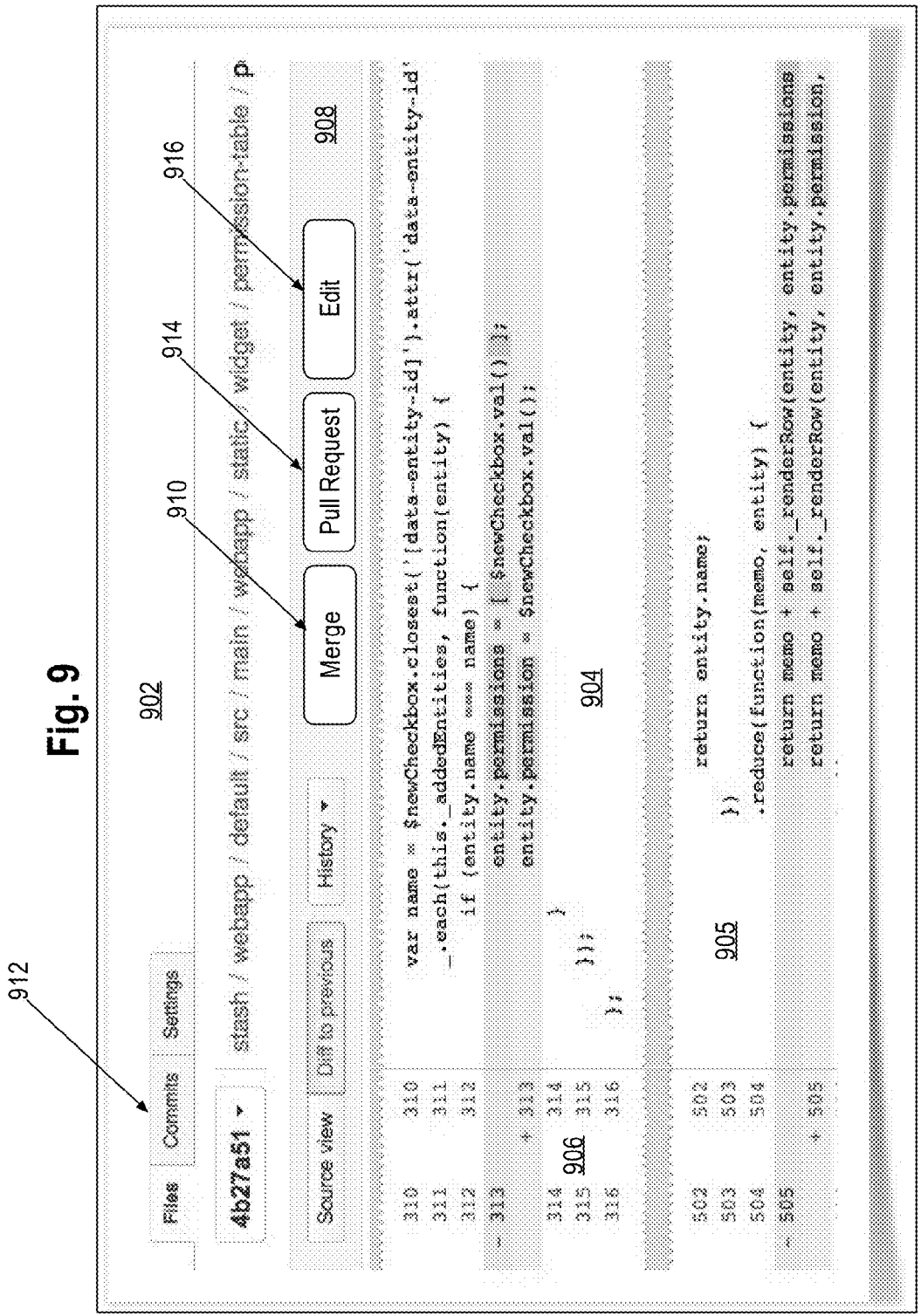
FIG. 9 illustrates a screen shot showing a "diff to previous" screen for a code comparison in one an embodiment.

FIG. 9 illustrates an example screen display showing "diff to previous" screen for a code comparison in one an embodiment. In an embodiment, a screen display 902 comprises one or more source code display panels 904, 905 that display lines of source code, with changes indicating using distinctive color, highlighting or other indications. Different panels 904, 905 may be associated with different code branches. Lines of source code are displayed in association with line numbers 906. Display 902 may include a toolbar 908 comprising GUI widgets which when selected cause invoking specified processing functions. In an embodiment, the toolbar 908 comprises a Merge button 910, Pull Request button 914, and Edit button 916.

In an embodiment, the Merge button 910 is configured to receive user input indicating initiating a merge action. Selecting the Merge button 910, in an embodiment, causes the system to attempt to merge the source branch into the target branch. In other embodiments, merge button 910 may be implemented in a view of files or repositories in other forms. In response to selecting merge button 910, in an embodiment, the system 2 causes displaying a user interface panel that prompts the user to enter or identify a source branch, source repository, destination branch, destination repository, and commit message. In some embodiments, the panel is pre-populated with branch identifiers that correspond to the code that was displayed in source code display panels 904, 905. Alternatively, a branch selection dialog may be used. The specific form of the request is not critical, and other embodiments may include other fields or values. In one implementation, a merge request may be implemented in the same form as a pull request, omitting any requirement for approval by another user.

Figure 11:
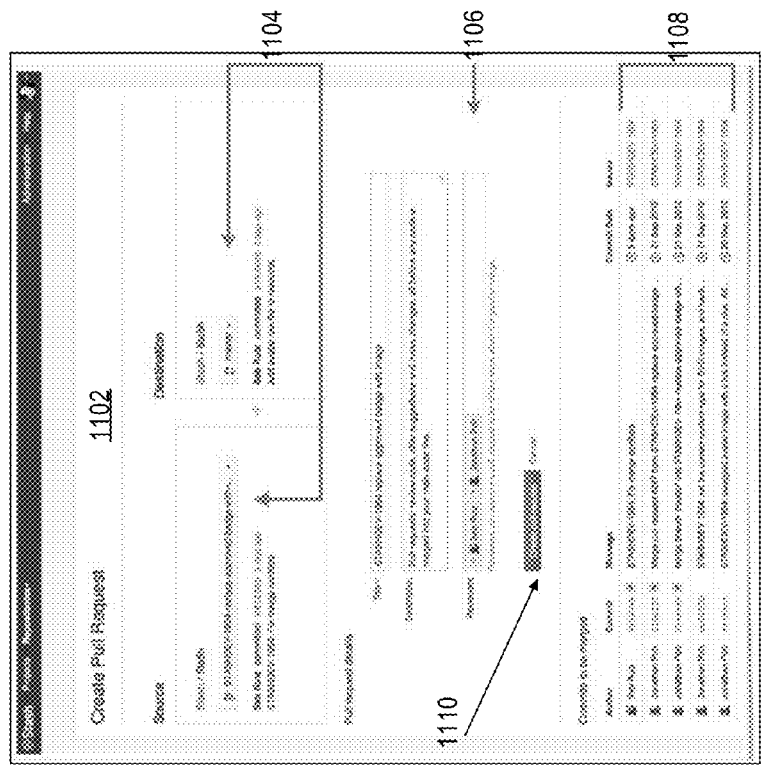
FIG. 11 illustrates a pull request form in one embodiment.

In an embodiment, selecting Pull Request button 914 causes displaying a Create Pull Request user interface panel in relation to a branch, portions of which are shown in display panels 904, 905. FIG. 11 illustrates a pull request form in one embodiment. The Pull Request panel provides a rapid way to move from a comparison of two branches of source code to a pull request. In an embodiment, selecting the Edit button 916 causes transitioning to a branch selection dialog.

Figure 10:
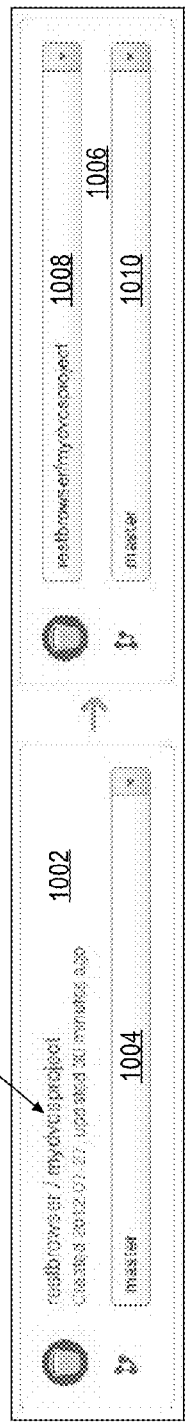
FIG. 10 illustrates a dialog for designating a source repository and destination repository pursuant to a merge in a pull request.

FIG. 10 illustrates a dialog for designating a source repository and destination repository pursuant to a merge in a pull request. In an embodiment, a portion of a GUI panel comprises a source repository panel 1002 and a destination repository panel 1006. The source repository panel 1002 is pre-populated with a source repository name 1001, and comprises a source branch selection widget 1004 that is configured as a pull-down menu to permit selecting or entering a source branch identifier. The destination repository panel 1006 may comprise a destination repository selection widget 1008 that is configured as a pull-down menu to permit selecting or entering a destination repository identifier, and a destination branch selection widget 1010 that is configured as a pull-down menu to permit selecting or entering a destination branch identifier.

In an embodiment, any source repository known to the system 2 may be selected. To preview the effect of changes in a reverse direction, the user may swap selections of repositories in the merge request panel. If an automatic merge cannot be performed, then in an embodiment, the system automatically provides instructions for performing the merge using command-line commands.

In an embodiment, each tab in a set of tabs 912 may be selected to cause displaying different views and metadata relating to the code including source code files, commits, and settings.

Referring again to FIG. 11, in one embodiment to create a pull request, the user navigates to the repository having changes to code, selects the Pull Request button, and completes a pull request form of the form of FIG. 11. In one embodiment, a pull request form 1102 comprises selection panels 1104 for specifying source and destination repositories. The form 1102 may include a reviewer specification panel 1106 for identifying other users to act as reviewers of the pull request. The form 1102 may display a list 1108 of commits to be merged. A CREATE button 1110 is configured to cause the creation of the pull request in response to selection of the button. In response, the system 2 opens the user's latest request on the Pull Request page of the original repository. To see a list of all pull requests against that repository, the user selects a Pull Requests button in the navigation bar.

Once a pull request is created, the reviewer(s) identified in the request or any user who has read permission for the destination repository can accept or reject the request. In an embodiment, to accept a pull request, a user navigates to the user's repository and selects s PULL REQUESTS option in a navigation bar. In response, the system 2 displays a list of incoming pull requests in an OPEN panel. The user may select a pull request on the list. In response, the system 2 is configured to cause displaying details of the pull request including the branches to be merged, and to automatically cause displaying a diff of the changes. The user also may view details of the commits involved in the request, or comment activity relating to the request.

Figure 12:
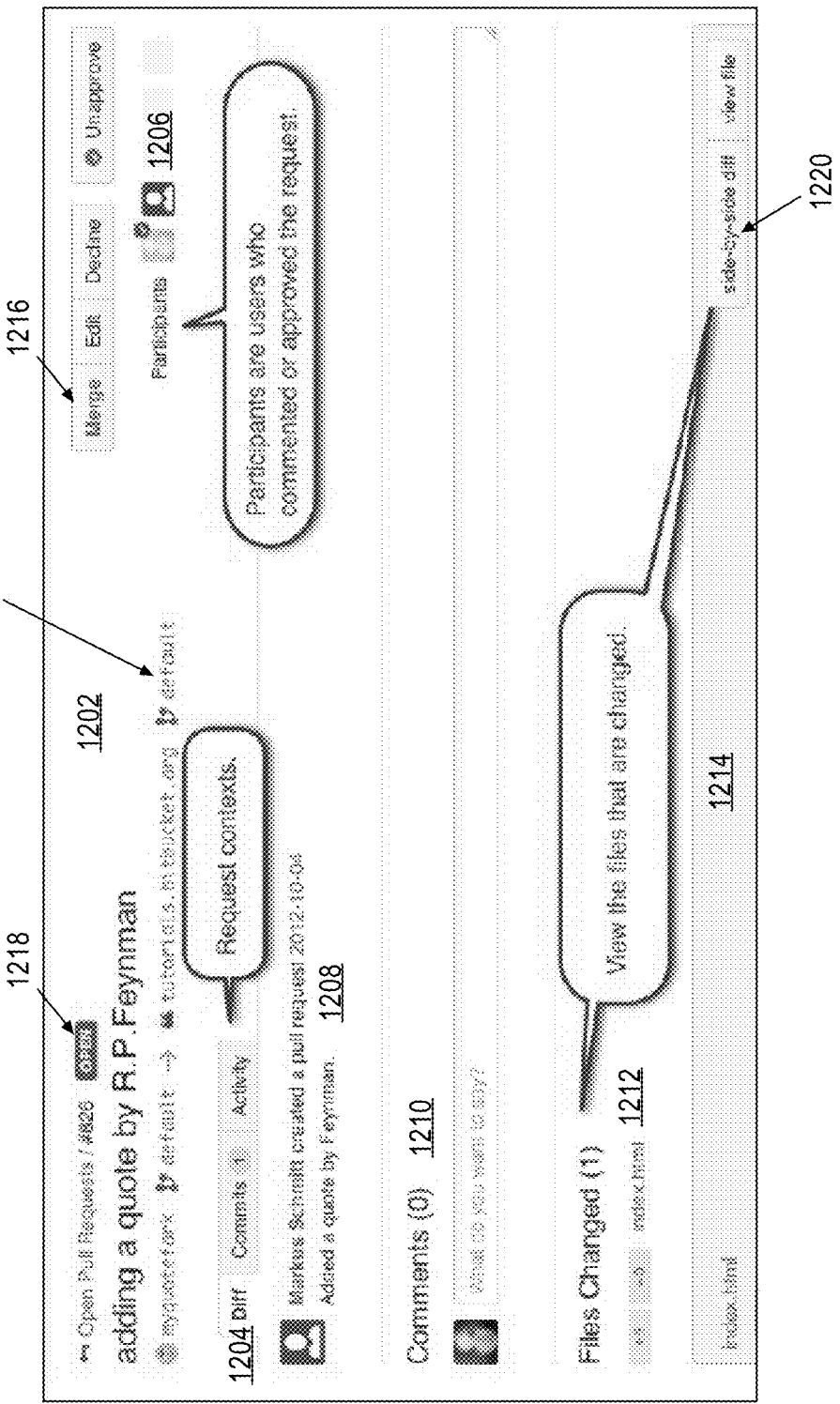
FIG. 12 illustrates a dialog for accepting a pull request without conflicts.

FIG. 12 illustrates a dialog for accepting a pull request without conflicts; FIG. 12 provides an example of a view of an open pull request that a user has initiated. While FIG. 12 reflects an implementation in the context of a cloud-based system (FIG. 2B), similar concepts could be implemented in the context of an on-premises system (FIG. 2A). In an embodiment, a pull request panel 1202 comprises a context identifier 1218, a to-and-from line 1205, a set of tabs 1204 associated with different request contexts, a participants list 1206, request details 1208, a comments sub panel 1210, a file list 1212, a code panel 1214, a comparison control 1220, and a set of action buttons 1216. In an embodiment, the context identifier 1218 is configured to indicate a then-current context of the panel; in this case the user is viewing a request that is open, so the context is OPEN. The to-and-from line 1205 summarizes the merge to be performed by briefly identifying the source repository, source branch, destination repository, and destination branch. The tabs 1204 associated with different request contexts may comprise a DIFF, COMMITS, and ACTIVITY tab; in the example of FIG. 12, the DIFF tab is selected to enable viewing a comparison of the commits to be merged.

In an embodiment, the participants list 1206 indicates users who are associated with the pull request such as the requester and one or more approvers; in addition to a list of participants, in an embodiment, a set of explicit reviewers may be defined in association with a request. The request details 1208 may include the user who created the pull request, a timestamp, and the commit message that the user included in the request. The comments sub panel 1210 may indicate any comments previously entered by other users and is configured to receive entry of a new comment, optionally, from the current user. The file list 1212 comprises a list of files involved in the merge, and corresponding source code may be displayed in the code panel 1214 based upon the comparison control 1220, which may be used to select a single file or a side-by-side diff, in this example. In an embodiment, action buttons 1216 include MERGE, EDIT, DECLINE and UNAPPROVE options which, when selected, cause executing a merge specified in the pull request, or permit the reviewing user to edit, decline, or mark the pull request as not approved.

In one embodiment, when the fork changed after the pull request was sent, the system may apply such changes in the fork to the pull request automatically. In another embodiment, panel 1202 may display an UPDATE pull request button adjacent to a particular request when the fork changed after the pull request was sent. In response, the user may select the UPDATE pull request button to apply the changes in the fork to the pull request.

Figure 13:
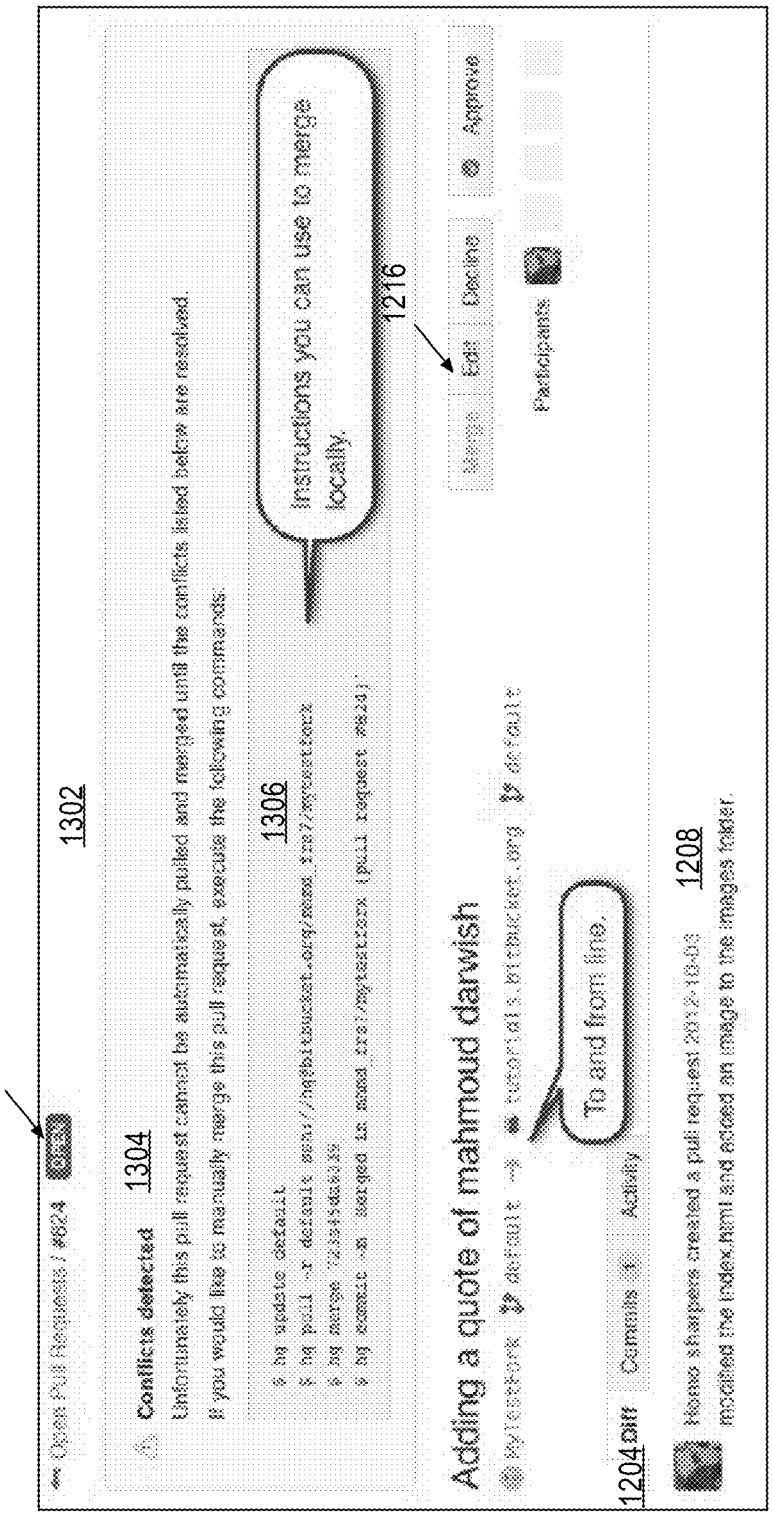
FIG. 13 illustrates a dialog for resolving a pull request with conflicts.

FIG. 13 illustrates a dialog for resolving a pull request with conflicts. In an embodiment, a pull request panel 1302 of FIG. 13 has the format of panel 1202 of FIG. 12, and additionally includes a conflicts sub panel 1304 stating a warning with respect to change conflicts. In an embodiment, instructions 1306 are automatically generated and displayed to provide information about how to perform a manual merge at the command line. Using the approach of FIG. 13, the system 2 may detect conflicts in the code involved in a pull request and may notify the user with instructions how to proceed, rather than automatically accepting and merging the code. Typically the user pulls the conflicting changes to a local repository and resolves the conflict in the local repository.

Figure 14:
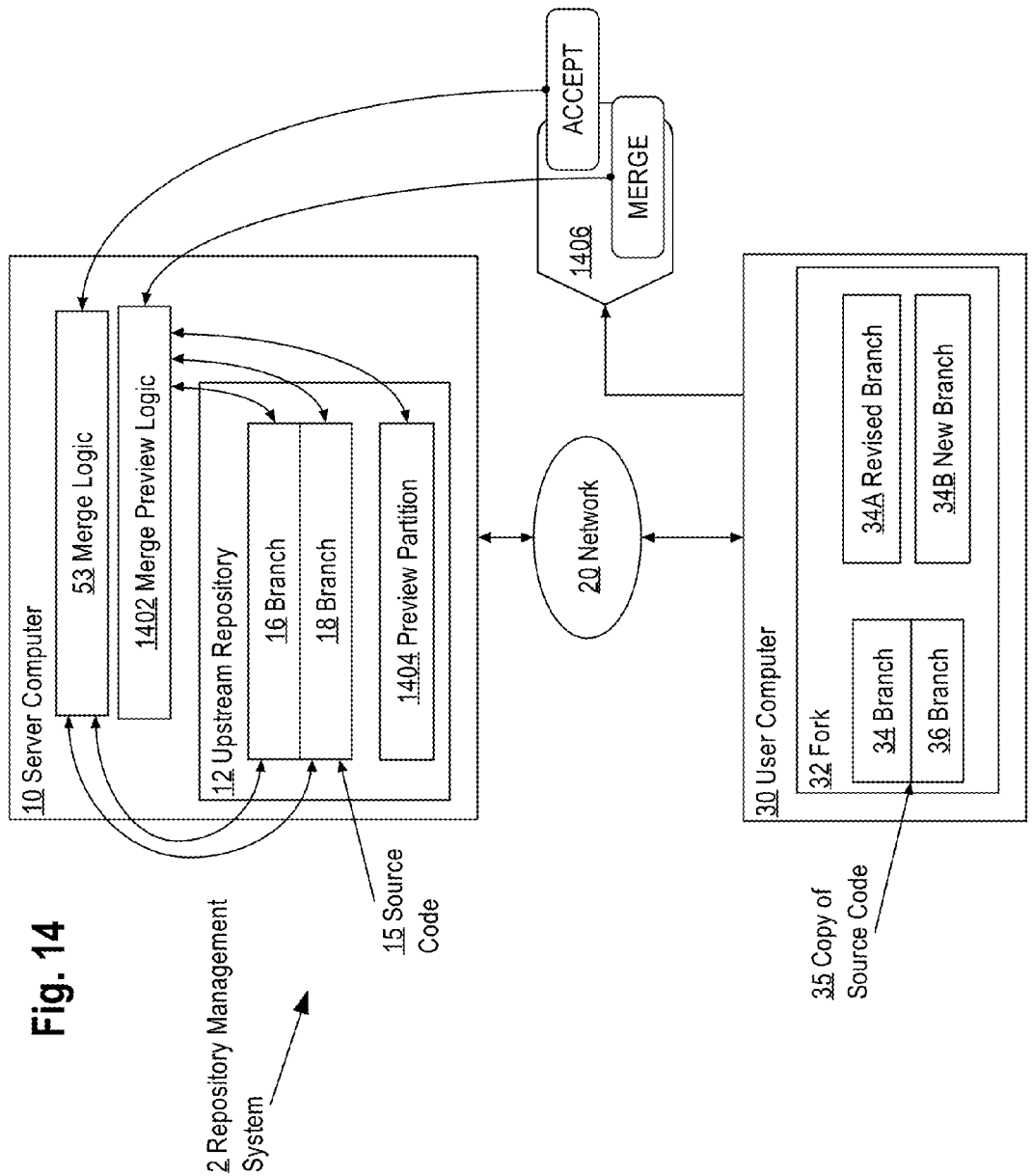
FIG. 14 illustrates a repository in which a pull request merge preview may be performed.

FIG. 14 illustrates the system of FIG. 1 having a preview partition in the upstream repository in which a pull request merge preview may be performed. In an embodiment, rather than performing a diff to the common ancestor of the branches involved in a prospective merge, a merge preview comprises performing a merge in a manner that enables displaying the result when an actual merge occurs.

In an embodiment, user computer 30 is coupled to a display device 1406 configured with a user interface that includes a MERGE button and an ACCEPT button. In an embodiment, selecting the MERGE button causes user computer 30 to invoke merge preview logic 1402, which is configured to perform a merge of the branches in the pull request, and to store results in a preview partition 1404 in the upstream repository 1202. The results are displayed to the display device 1406. In an embodiment, the merge preview logic 1402 is configured to perform the merge process described above in connection with FIG. 8, except that the results are stored in the preview partition 1404 rather than committed to the main branch of the upstream repository 12.

The user may view and inspect the merge preview results. In an embodiment, selecting a MERGE button causes the user computer to invoke merge logic 53, which performs a merge of the branches against the upstream repository 12—that is, a real merge rather than a preview. In an embodiment, the results of the merge preview in preview partition 1404 may be applied to the source code 15 and the results may be displayed with display device 1406.

In one embodiment, referring again to FIG. 10, when the repository is GIT, the panel of FIG. 10 may include an option to delete the branch when the merge request is performed if an administrator of the associated repository has enabled the option. If the option is not enabled, then the option may be grayed-out in the panel of FIG. 10. If the user elects to close a branch after the pull request, then in response, the system 2 automatically closes the branch when the request is accepted. A closed branch does not appear in a list of branches for other operations.

4.3 Remote Shared Data Center Implementation

Merge preview also may be implemented in the context of a shared data center system such as FIG. 2B in which the repositories are based upon MERCURIAL or GIT.

In an embodiment, merge preview is initiated in response to user input specifying a source branch and a destination branch for a prospective merge. The branches may be in the same repository, or a different repository; if the branches are in different repositories than the user's local repository then a GIT "fetch" command may be used to obtain branch information from a different repository. The merge of the source branch with the destination branch is simulated in memory without the use of files on disk and without the use of a separate or temporary clone of the repository. Thus, in this implementation, a merge preview can be performed in a single repository, without use of the resources involved in checking out the repository. In an embodiment using GIT repositories, a temporary tree as a temporary holding location for the files to be merged or index of files to be committed. A temporary index is created to record the changes to be committed and thus to represent a final merge commit, for which a diff is shown. In an embodiment, the temporary index and temporary tree are stored in non-volatile, non-memory storage, such as disk storage.

In an embodiment, a merge process is executed using the temporary tree and temporary index. The merge process obtains input specifying the source branch and destination branch to be merged, and optionally an identifier of a repository, which may be the upstream repository or a fork. Based upon the input, the process determines a set of specific files to be merged, and a common ancestor branch or first parent branch of the source branch and destination branch.

After the merge process selects the files to be used from both sides of the merge, for files that have changed on both sides, a GIT function is invoked to perform a content-level merge. Results are obtained from the GIT function and updated into the index. The results are committed to create an unreferenced commit object with respect to the first parent branch; the state of the repository remains unchanged. The user is presented with a diff view of that commit to its first parent branch.

This approach has several benefits over other approaches. For example, in a situation in which users make changes are made in the destination branch that are then merged into the source branch—for example, because a development team is regularly updating the upstream branch—if the system provides a diff of the source and destination branch, then the resulting diff view will undesirably display changes that were already made in the destination branch; this information is not useful to the user. This issue arises, for example, in using the GIT command "git merge tree." However, performing the diff to the most recent common ancestor as in the present approach avoids this issue, and also enables identifying and indicating conflicts between the two branches.

For MERCURIAL, the process is functionally similar to the preceding description, except that all storage is performed using memory.

The merge preview may be committed, after user inspection, based upon the temporary index. As the temporary index is unreferenced in the system, it may be discarded when the final merge commit to the upstream repository is complete. In one implementation, inherent garbage collection functions of the repository may automatically reclaim member associated with the temporary index; because there are no branch references to the temporary index, GIT garbage collection will automatically remove the temporary index.

In one embodiment, referring again to FIG. 10, the panel of FIG. 10 may include an option to close the branch when the merge request is performed. If the user elects to close a branch after the pull request, then in response, the system 2 automatically closes the branch when the request is accepted. A closed branch does not appear in a list of branches for other operations.

In some embodiments, it may be useful for a user to use a workflow to test a change set on a local computer before accepting a pull request into the main branch. In an embodiment, testing a change set on a local computer may be performed for any pull request. In response to receiving a pull request, the user may update the local repository with the incoming change set, then investigate and/or test the change set. If the change set is acceptable, then the user may merge the change set into the user's local repository, resolving any conflicts. Thereafter, referring again to FIG. 2B, the user may push the local repository, such as clone 32, back to the upstream repository 12. Using browser communication with the merge logic 70, the user computer 30 may mark the pull request as ACCEPTED by accessing the Pull Requests tab. Alternatively, the user may discard the changes locally and select REJECT in the Pull Requests tab.

Figure 15:
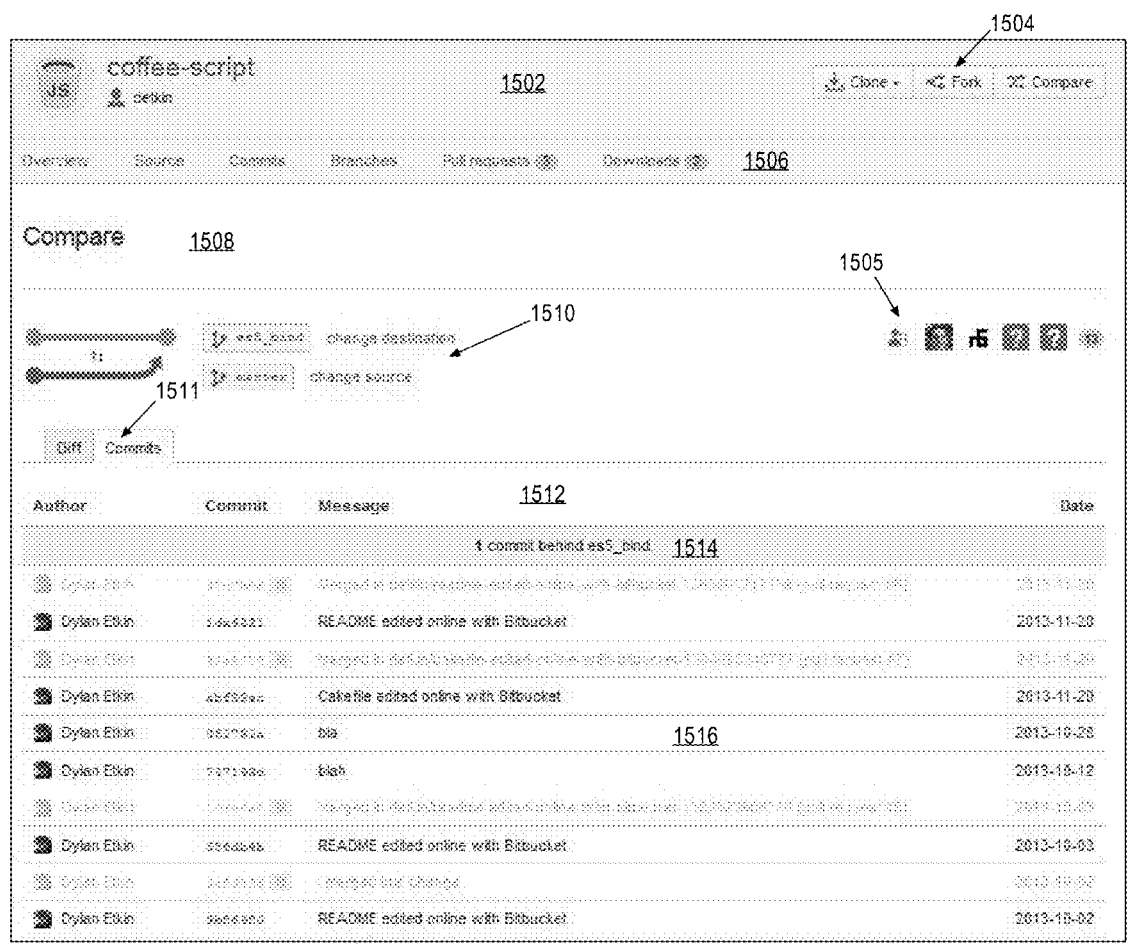
FIG. 15 illustrates an example user interface display for use in merge preview with commits displayed, in a cloud-based embodiment.

FIG. 15 illustrates an example user interface display integrated with a merge preview function in which commits displayed, in a cloud-based embodiment. As further described, selecting a DIFF tab in FIG. 15 yields a merge preview with specific features. As an introduction, in one embodiment, merge logic 70 (FIG. 2B) is configured with merge preview functionality capable of generating one or more user interface screen displays of the form seen in FIG. 15, FIG. 16, FIG. 17, FIG. 18 for delivery to the browser 62 and for providing browser-executable code that implements one or more aspects of merge preview operations as described herein. Thus, in an embodiment, a user interface window 1502 of FIG. 15 may comprise dynamic HTML with Javascript elements that are generated by merge logic 70 and delivered to the browser 62 for display and execution on the client computer.

In the example of FIG. 15, window 1502 comprises a set of function controls 1504 which when selected can cause the system 2 to create a clone, create a fork, or perform a compare operation; the latter is illustrated in FIG. 15. Window 1502 may comprise a toolbar 1506 of a plurality of hyperlinks which when selected permit displaying an overview, source, commits, branches, pull requests, and downloads associated with a particular compare operation. In an embodiment, a merge preview also may be obtained by selecting the Branches link to view ahead and behind information for a specified branch in relation to the main branch of the repository. Further, selecting a branch in any of the views of FIG. 15, FIG. 16, FIG. 17, FIG. 18 causes the system to display a comparison of the selected branch to the main branch, providing another visualization of a merge preview. In an embodiment, creating a pull request or viewing the diff associated with an existing pull request will provide merge previews as well. In each of these cases, visualization of a merge preview may comprise a diff of the contents of the repository at the merge commit compared to the merge's first parent; any conflicts in the merge may be identified using conflict markers, as further described herein.

Window 1502 further comprises a branch graphic 1510 that illustrates the branches involved in a prospective merge and the direction of merge; a user list 1505 indicates users associated with creating a pull request for the merge or reviewing the pull request.

Window 1502 further comprises control tabs 1511 denoted DIFF, COMMITS that may be selected to alternatively display commits for a particular merge or a diff of the branches involved in a merge. In the example of FIG. 15, the COMMITS link has been selected to cause displaying a table 1512 comprising a plurality of entries 1516 indicating details of various commits. A message bar 1514 includes an alert indicating how the source branch relates to the destination branch in terms of numbers of commits and whether the source branch has advanced beyond or is trailing the destination branch.

Figure 16:
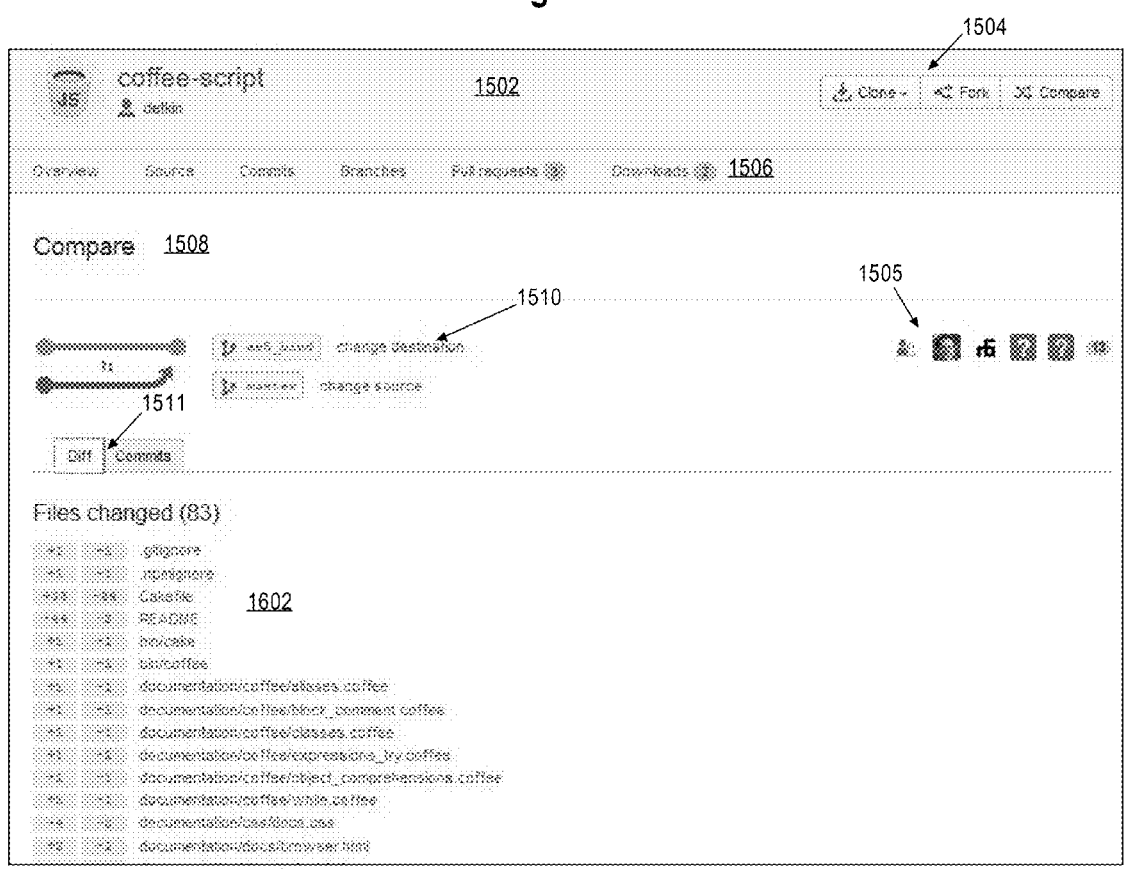
FIG. 16 illustrates an example user interface display for use in previewing a merge in which conflicts exist, in a cloud-based embodiment.

FIG. 16 illustrates an example user interface display for use in merge preview with diff displayed, in a cloud-based embodiment. FIG. 16 has the same general form as FIG. 15, except that the DIFF option of control tabs 1511 is displayed. In response, the merge logic 70 is configured to display a list 1602 of files that have changed in the source branch as compared to the destination branch. Each name of a file in list 1602 is rendered as a hyperlink which, when selected, causes displaying the contents of that file, optionally as a diff against a corresponding file in the destination branch.

Figure 17:
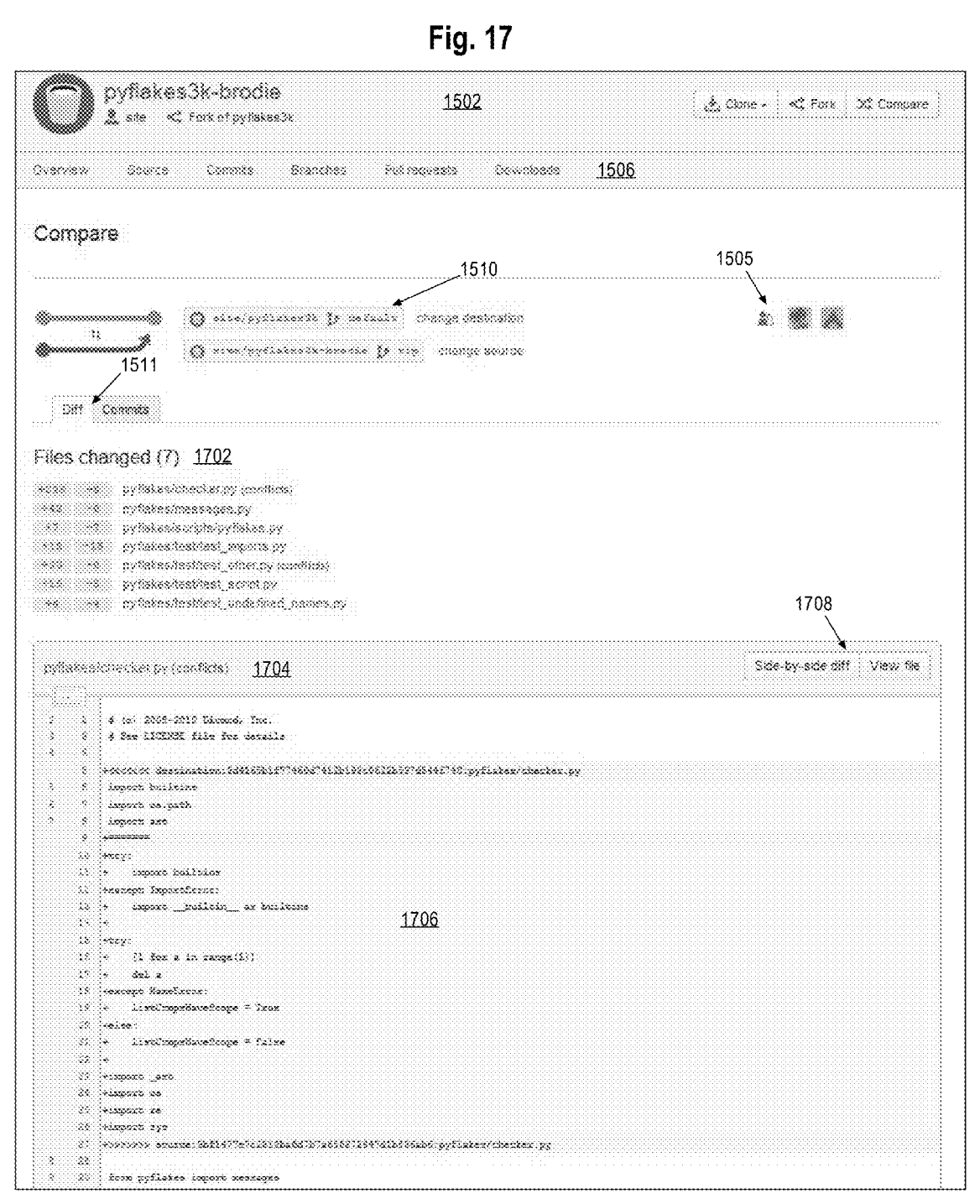

FIG. 17 illustrates an example user interface display for use in previewing a merge in which content-level conflicts exist, in a cloud-based embodiment. FIG. 17 has the same general form as FIG. 15 except that in the example of FIG. 17 the DIFF tab is selected among the control tabs 1511 to cause displaying a list 1602 of files that have been changed in the source branch as compared to the destination branch. Concurrently window 1502 displays a source code listing 1704 for one of the files in the list 1702 and it will be seen that listing 1704 corresponds to the first file item in list 1702. In an embodiment, list 1702 automatically includes distinctive indicators, such as the label "(conflicts)" in color, highlighting or other distinctive visual presentation, in association with the name of each file that conflicts with a corresponding file in the destination branch. For example, red color may indicate deleted files, green color may indicate added files, and yellow color may indicate changed files; similar labels for lines of code in the other displays shown herein may indicate content-level conflicts as next described. When a file in list 1702 has a conflict, the conflict label also is shown in source code listing 1704 in association with the file name. The conflicts in the example of FIG. 17 are at the content level, meaning that individual lines of code are inconsistent among the branches. In contrast, as later discussed, FIG. 18 shows a file-level conflict.

In an embodiment, listing 1704 may be displayed as a side-by-side diff with respect to a corresponding file in the destination branch in which added code lines, deleted code lines, and modified code lines 1706 are indicated using distinctive color, highlighting or other visual treatment whereas unmodified code lines are not subject to special visual treatment. For example, red color may indicate deleted lines, green color may indicate added lines, and yellow color may indicate changed lines for such content-level conflicts. This approach may assist the user in identifying conflicting code lines. Alternatively the user may select a display control 1708 to cause displaying the text of a file in the list 1702 without a diff comparison to another file.

Figure 18:
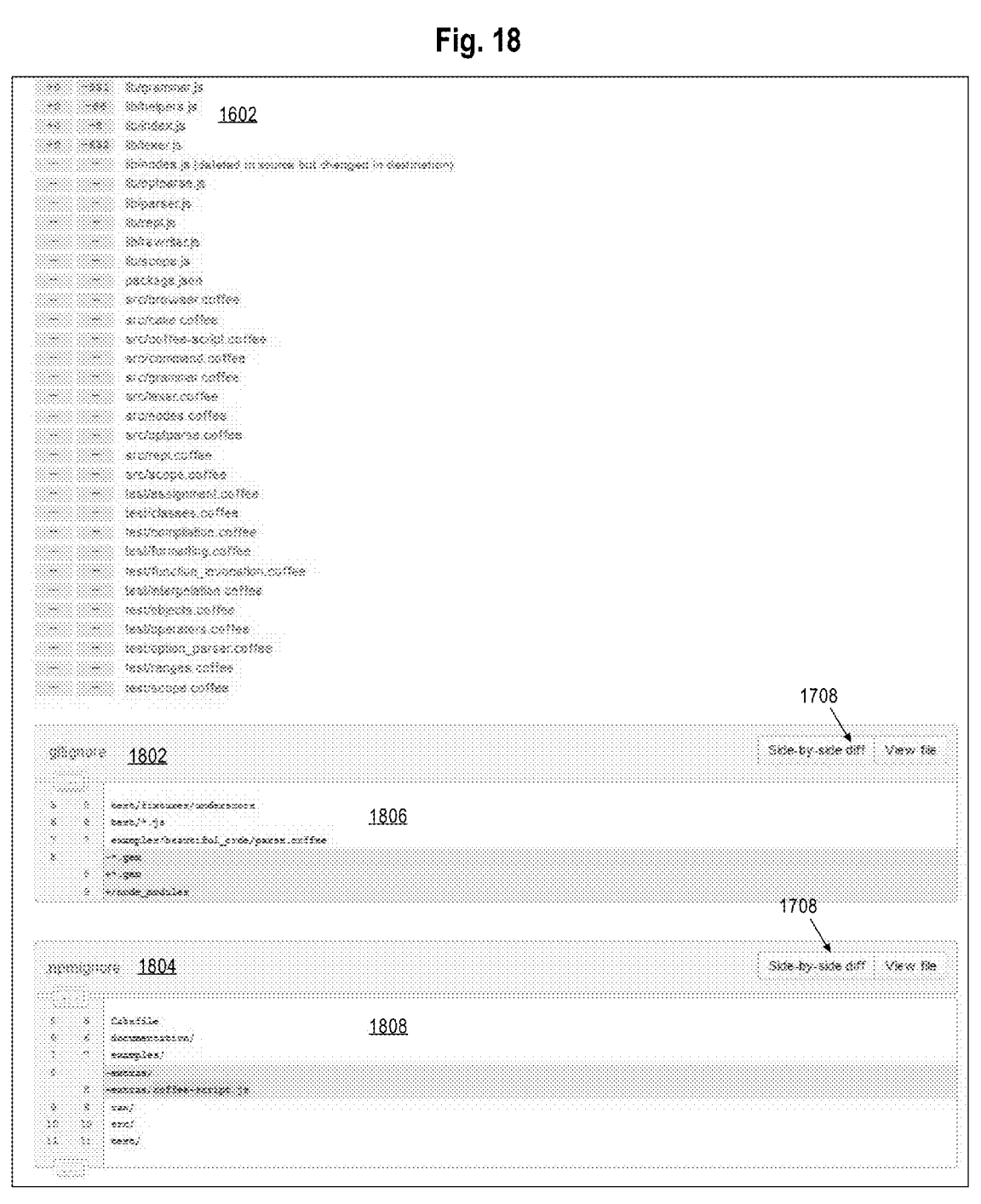

FIG. 18 illustrates an example user interface display for use in previewing a merge in which conflicts in a diff exist, in a cloud-based embodiment. FIG. 18 has the same general format as FIG. 17 and the example of FIG. 18 may be viewed as similar to FIG. 17 except that the user has scrolled down a long list 1602 of the files. In this example, a file-level conflict is identified, namely that the file "nodes.js" is deleted in the source branch but was changed in the destination branch.

In an embodiment, at the end of the file list, the system displays one or more code windows 1802, 1804, each associated with one of the files in the list 1602 that contains a conflict. There may be any number of such windows. Each of the windows 1802, 1804 respectively comprises a code listing 1806, 1808 in which conflicting or changed lines in comparison to the destination branch may be indicated using color, highlighting, or other distinctive visual representation.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 20:
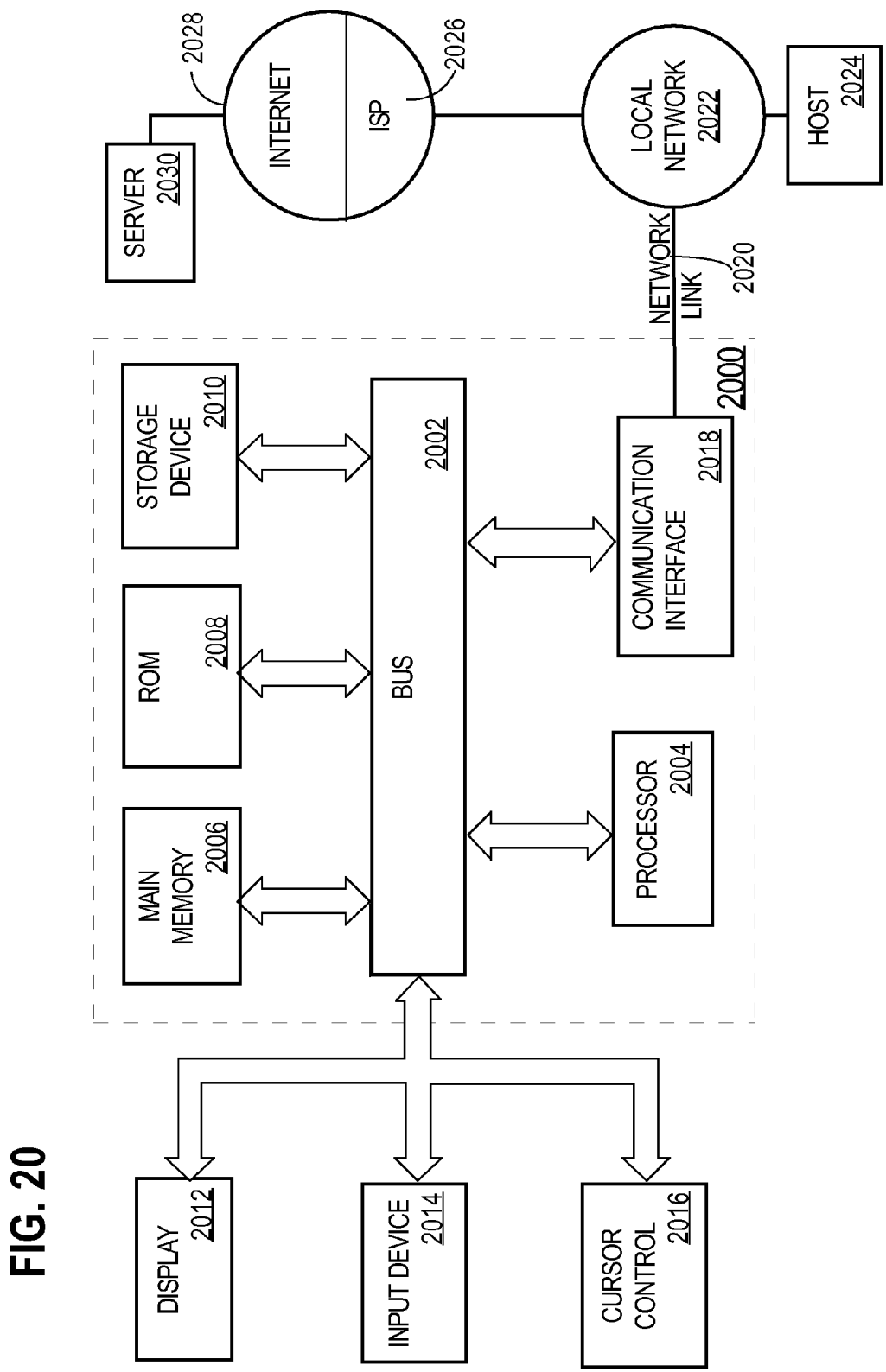
FIG. 20 illustrates a computer system with which various embodiments may be used.

For example, FIG. 20 is a block diagram that illustrates a computer system 2000 upon which an embodiment of the invention may be implemented. Computer system 2000 includes a bus 2002 or other communication mechanism for communicating information, and a hardware processor 2004 coupled with bus 2002 for processing information. Hardware processor 2004 may be, for example, a general purpose microprocessor.

Computer system 2000 also includes a main memory 2006, such as a random access memory (RAM) or other dynamic storage device, coupled to bus 2002 for storing information and instructions to be executed by processor 2004. Main memory 2006 also may be used for storing temporary variables or other intermediate information during execution of instructions to be executed by processor 2004. Such instructions, when stored in non-transitory storage media accessible to processor 2004, render computer system 2000 into a special-purpose machine that is customized to perform the operations specified in the instructions.

Computer system 2000 further includes a read only memory (ROM) 2008 or other static storage device coupled to bus 2002 for storing static information and instructions for processor 2004. A storage device 2010, such as a magnetic disk or optical disk, is provided and coupled to bus 2002 for storing information and instructions.

Computer system 2000 may be coupled via bus 2002 to a display 2012, such as a cathode ray tube (CRT), for displaying information to a computer user. An input device 2014, including alphanumeric and other keys, is coupled to bus 2002 for communicating information and command selections to processor 2004. Another type of user input device is cursor control 2016, such as a mouse, a trackball, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane.

Computer system 2000 may implement the techniques described herein using customized hard-wired logic, one or more ASICs or FPGAs, firmware and/or program logic which in combination with the computer system causes or programs computer system 2000 to be a special-purpose machine. According to one embodiment, the techniques herein are performed by computer system 2000 in response to processor 2004 executing one or more sequences of one or more instructions contained in main memory 2006. Such instructions may be read into main memory 2006 from another storage medium, such as storage device 2010. Execution of the sequences of instructions contained in main memory 2006 causes processor 2004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 2010. Volatile media includes dynamic memory, such as main memory 2006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2002. Transmission media can also take the form of acoustic or light waves, such as those generated during radio-wave and infra-red data communications.

Various forms of media may be involved in carrying one or more sequences of one or more instructions to processor 2004 for execution. For example, the instructions may initially be carried on a magnetic disk or solid state drive of a remote computer. The remote computer can load the instructions into its dynamic memory and send the instructions over a telephone line using a modem. A modem local to computer system 2000 can receive the data on the telephone line and use an infra-red transmitter to convert the data to an infra-red signal. An infra-red detector can receive the data carried in the infra-red signal and appropriate circuitry can place the data on bus 2002. Bus 2002 carries the data to main memory 2006, from which processor 2004 retrieves and executes the instructions. The instructions received by main memory 2006 may optionally be stored on storage device 2010 either before or after execution by processor 2004.

Computer system 2000 also includes a communication interface 2018 coupled to bus 2002. Communication interface 2018 provides a two-way data communication coupling to a network link 2020 that is connected to a local network 2022. For example, communication interface 2018 may be an integrated services digital network (ISDN) card, cable modem, satellite modem, or a modem to provide a data communication connection to a corresponding type of telephone line. As another example, communication interface 2018 may be a local area network (LAN) card to provide a data communication connection to a compatible LAN. Wireless links may also be implemented. In any such implementation, communication interface 2018 sends and receives electrical, electromagnetic or optical signals that carry digital data streams representing various types of information.

Network link 2020 typically provides data communication through one or more networks to other data devices. For example, network link 2020 may provide a connection through local network 2022 to a host computer 2024 or to data equipment operated by an Internet Service Provider (ISP) 2026. ISP 2026 in turn provides data communication services through the world wide packet data communication network now commonly referred to as the "Internet" 2028. Local network 2022 and Internet 2028 both use electrical, electromagnetic or optical signals that carry digital data streams. The signals through the various networks and the signals on network link 2020 and through communication interface 2018, which carry the digital data to and from computer system 2000, are example forms of transmission media.

Computer system 2000 can send messages and receive data, including program code, through the network(s), network link 2020 and communication interface 2018. In the Internet example, a server 2030 might transmit a requested code for an application program through Internet 2028, ISP 2026, local network 2022 and communication interface 2018.

The received code may be executed by processor 2004 as it is received, and/or stored in storage device 2010, or other non-volatile storage for later execution.

A computer system as described herein may be configured in a plurality of useful arrangements. In one approach, a data processing method comprises using a server computer, obtaining from one or more non-transitory computer-readable data storage media a copy of one or more sequences of instructions that are stored on the media and which when executed using a particular user computer among a plurality of user computers cause the particular user computer to perform, using the particular user computer alone or in combination with the server computer, the techniques that are described herein; and using the server computer, downloading the copy of the one or more sequences of instructions to any user computer among the plurality of user computers.

In another approach, a computer system comprises a server computer comprising one or more non-transitory computer-readable data storage media stored with one or more sequences of instructions which when executed using a particular user computer among a plurality of user computers cause the particular user computer to perform: using the particular user computer, alone or in combination with the server computer, the techniques that are described herein; and in the server computer, stored downloading instructions which, when executed using the server computer, cause downloading a plurality of copies of the one or more sequences of instructions to the plurality of user computers.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing system comprising:
   one or more processors;
   one or more non-transitory computer-readable storage media storing sequences of instructions which, when executed by the one or more processors, cause the one or more processors to perform:
   determining whether first content that is associated with an upstream repository comprises a revision that is absent from second content that is associated with a fork of the first content, wherein the first content comprises a first branch and the second content comprises a second branch, and wherein the first branch corresponds to the second branch;
   determining whether the second branch in the second content comprises a second revision that is absent from the first branch in the first content, in response to a determination that the first content comprises the revision that is absent from the second content;
   in response to determining that the second branch of the second content comprises no revision that is absent from the first branch, synchronizing changes to the first branch from the upstream repository to the second branch, without user intervention;
   in response to determining that the second branch of the second content comprises the second revision that is absent from the first branch in the first content:
      causing outputting to a computer display device an option to synchronize the second branch of the second content with the first branch in the first content;
      receiving a selection of the option;
      in response to the selection of the option, synchronizing the second branch in the second content with the first branch in the first content without user intervention.

2. The system of claim 1, comprising instructions which when executed cause outputting a second option specifying merging the second branch of the second content, which comprises the second revision, with the first branch of the first content, which includes a third revision, to create a revised branch in the second content that includes the second revision and the third revision;
   in response to selection of the second option, automatically merging the second branch of the second content, which comprises the second revision, with the first branch of the first content, which includes the third revision, to create the revised branch in the second content that includes the second revision and the third revision.

3. The system of claim 1, further comprising sequences of instructions which, when executed by the one or more processors, cause the one or more processors to perform:
   causing outputting to a computer display device an option to perform at least one of saving the second revision to a new branch in the second content, and bringing commit objects from the first branch into the second branch;
   receiving a selection of the option;
   performing, in response to the selection, at least one of saving the second revision to a new branch in the second content, and bringing commit objects from the first branch into the second branch.

4. The system of claim 1, further comprising sequences of instructions which, when executed by the one or more processors, cause the one or more processors to perform:
causing outputting to a computer display device an option to perform saving the second revision to a new branch in the second content;
receiving a selection of the option;
in response to the selection, saving the second revision to a new branch in the second content.

5. The system of claim 1 wherein the first content and second content comprise computer program source code.

6. A data processing method, comprising:
determining whether first content that is associated with an upstream repository comprises a revision that is absent from second content that is associated with a fork of the first content, wherein the first content comprises a first branch and the second content comprises a second branch, and wherein the first branch corresponds to the second branch;
determining whether the second branch in the second content comprises a second revision that is absent from the first branch in the first content, in response to a determination that the first content comprises the revision that is absent from the second content;
in response to determining that the second branch in the second content comprises no revision that is absent from the first branch, synchronizing changes to the first branch from the upstream repository to the second branch, without user intervention;
in response to determining that the second branch of the second content comprises the second revision that is absent from the first branch in the first content:
    causing outputting to a computer display device an option to synchronize the second branch of the second content with the first branch in the first content;
    receiving a selection of the option;
    in response to the selection of the option, synchronizing the second branch in the second content with the first branch in the first content without user intervention;
    wherein the method is performed using one or more computing devices.

7. The method of claim 6, further comprising:
outputting a second option specifying merging the second branch of the second content, which comprises the second revision, with the first branch of the first content, which includes a third revision, to create a revised branch in the second content that includes the second revision and the third revision;
in response to selection of the second option, automatically merging the second branch of the second content, which comprises the second revision, with the first branch of the first content, which includes the third revision, to create the revised branch in the second content that includes the second revision and the third revision.

8. The method of claim 6, further comprising:
causing outputting to a computer display device an option to perform at least one of saving the second revision to a new branch in the second content, and bringing commit objects from the first branch into the second branch;
receiving a selection of the option;
performing, in response to the selection, at least one of saving the second revision to a new branch in the second content, and bringing commit objects from the first branch into the second branch.

9. The method of claim 6, further comprising:
causing outputting to a computer display device an option to perform saving the second revision to a new branch in the second content;
receiving a selection of the option;
performing, in response to the selection, saving the second revision to a new branch in the second content.

10. The method of claim 6, wherein the first content and second content comprise computer program source code.

11. A data processing method comprising:
using a server computer, obtaining from one or more non-transitory computer-readable data storage media a copy of one or more sequences of instructions that are stored on the media and which when executed using a particular user computer among a plurality of user computers cause performing, using the particular user computer alone or in combination with the server computer:
determining whether first content that is associated with an upstream repository comprises a revision that is absent from second content that is associated with a fork of the first content, wherein the first content comprises a first branch and the second content comprises a second branch, and wherein the first branch corresponds to the second branch;
determining whether the second branch in the second content comprises a second revision that is absent from the first branch in the first content, in response to a determination that the first content comprises the revision that is absent from the second content;
in response to determining that the second branch in the second content comprises no revision that is absent from the first branch, synchronizing changes to the first branch from the upstream repository to the second branch, without user intervention;
in response to determining that the second branch of the second content comprises the second revision that is absent from the first branch in the first content:
    causing outputting to a computer display device an option to synchronize the second branch of the second content with the first branch in the first content;
    receiving a selection of the option;
    in response to the selection of the option, synchronizing the second branch in the second content with the first branch in the first content without user intervention;
using the server computer, downloading the copy of the one or more sequences of instructions to any user computer among the plurality of user computers.

12. The method of claim 11, further comprising, using the particular user computer alone or in combination with the server computer:
outputting a second option specifying merging the second branch of the second content, which comprises the second revision, with the first branch of the first content, which includes a third revision, to create a revised branch in the second content that includes the second revision and the third revision;
in response to selection of the second option, automatically merging the second branch of the second content, which comprises the second revision, with the first branch of the first content, which includes the third revision, to create the revised branch in the second content that includes the second revision and the third revision.

13. The method of claim 11, further comprising, using the particular user computer alone or in combination with the server computer:
  causing outputting to a computer display device an option to perform at least one of saving the second revision to a new branch in the second content, and bringing commit objects from the first branch into the second branch;
  receiving a selection of the option;
  performing, in response to the selection, at least one of saving the second revision to a new branch in the second content, and bringing commit objects from the first branch into the second branch.

14. The method of claim 11, further comprising, using the particular user computer alone or in combination with the server computer:
  causing outputting to a computer display device an option to perform saving the second revision to a new branch in the second content;
  receiving a selection of the option;
  performing, in response to the selection, saving the second revision to a new branch in the second content.

15. The method of claim 11, wherein the first content and second content comprise computer program source code.

* * * * *